US009234351B1

(12) United States Patent
Echelman

(10) Patent No.: US 9,234,351 B1
(45) Date of Patent: Jan. 12, 2016

(54) POLAR-ORIENTED LATTICE ISOGRID FOR CIRCULAR STRUCTURES

(71) Applicant: UNITED LAUNCH ALLIANCE, L.L.C., Englewood, CO (US)

(72) Inventor: Philip M. Echelman, Denver, CO (US)

(73) Assignee: United Launch Alliance, L.L.C., Englewood, CO (US)

( * ) Notice: Subject to any disclaimer, the term of this patent is extended or adjusted under 35 U.S.C. 154(b) by 0 days.

(21) Appl. No.: 14/573,971

(22) Filed: Dec. 17, 2014

(51) Int. Cl.
*E04C 5/00* (2006.01)

(52) U.S. Cl.
CPC ........................................ *E04C 5/00* (2013.01)

(58) Field of Classification Search
CPC ............... E04C 5/00; E04C 2/32; E04C 2/40; E04C 2/42; E04G 3/24; E04B 2001/1987; E04B 2001/0491; E04B 2001/0469
USPC .................. 52/82, 644, 650.1, 651.11, 652.1; 119/479, 525–530
See application file for complete search history.

(56) References Cited

U.S. PATENT DOCUMENTS

| 3,940,891 | A | 3/1976 | Slysh |
| 4,140,828 | A | 2/1979 | Copping |
| 4,254,599 | A | 3/1981 | Maistre |
| 4,725,334 | A | 2/1988 | Brimm |
| 4,881,998 | A | 11/1989 | Youngkeit |
| 4,925,740 | A | 5/1990 | Norris et al. |
| 5,122,242 | A | 6/1992 | Slysh |
| 5,146,719 | A | 9/1992 | Saito et al. |
| 5,371,983 | A * | 12/1994 | Kawaguchi et al. ........... 52/81.1 |
| 6,245,274 | B1 | 6/2001 | Huybrechts et al. |
| 7,479,201 | B1 | 1/2009 | Wegner et al. |
| 7,871,487 | B1 | 1/2011 | Wegner et al. |
| 8,236,124 | B1 | 8/2012 | Wegner et al. |
| 8,435,375 | B1 | 5/2013 | Wegner et al. |
| 8,444,900 | B2 | 5/2013 | Wilson et al. |
| 8,584,988 | B1 | 11/2013 | Andrews |
| 2004/0025338 | A1 | 2/2004 | Green et al. |
| 2005/0252001 | A1 | 11/2005 | Green |
| 2012/0196080 | A1 | 8/2012 | Messina et al. |
| 2013/0108837 | A1 | 5/2013 | Blot |
| 2013/0302172 | A1 | 11/2013 | Williams |
| 2014/0041231 | A1 | 2/2014 | Andrews |

FOREIGN PATENT DOCUMENTS

| EP | 948085 | 10/1999 |
| WO | WO 2007/104674 | 9/2007 |

OTHER PUBLICATIONS

Wegner et al., "Application of Advanced Grid-Stiffened Structures Technology to the Minotaur Payload Fairing," American Institute of Aeronautics and Astronautics, 2002, 7 pages.
Huybrechts et al., "Grid Stiffened Structures: A Survey of Fabrication, Analysis and Design Methods," International Conference on Composite Materials (ICCM) Proceedings, 1999, 10 pages.
Jam et al., "Design of Anis Grid Composite Lattice Conical Shell Structures," Research Journal of Applied Sciences, 2012, vol. 7(9-12), pp. 435-443.

* cited by examiner

*Primary Examiner* — Patrick Maestri
(74) *Attorney, Agent, or Firm* — Sheridan Ross P.C.

(57) ABSTRACT

A new adaptable grid or lattice structure identified by the coined term "polargrid" is disclosed. A polargrid may be designed or engineered to fill any space between two generally circular structures and where the ribs will intersect with both circular structures at a node. The intersection of a polargrid with a circular structure will not occur mid-rib. Rather, a polargrid can be designed to always have ribs terminate at an inner or outer circular structure at a node. Polargrids have particular applicability in cylindrical structures or when interconnecting concentric circular or cylindrical structures that may or may not be co-planar.

19 Claims, 39 Drawing Sheets

POLAR-ORIENTED LATTICE ISOGRID FOR CIRCULAR STRUCTURES

FIELD

Embodiments of the present invention are in the field of isogrids and, more particularly, a new form of such structures named polargrids. Polargrids have particular applicability in cylindrical structures or when interconnecting concentric circular or cylindrical structures.

BACKGROUND

In many structural contexts, isogrids are used to add strength to a structure while minimizing the addition of weight. An isogrid is a type of partially hollowed-out structure formed usually from a single metal plate or face sheet with triangular integral stiffening ribs. It is extremely light and stiff. The triangular pattern in an isogrid is very efficient because it retains rigidity while saving material and therefore weight. The term isogrid is used because the structure acts like an isotropic material, with equal properties measured in any direction, and grid, referring to the sheet and stiffeners structure. The location where the ribs intersect is referred to as a node. An image of an isogrid is shown in FIG. 1.

A deficiency with isogrids arises when interconnecting two generally concentric circular structures. As used herein, the term circular structure will include structures that are generally circular in structure, such as a multi-sided polygon that approximates a circle, as well as columnar structures that are circular or approximately circular in cross-structure. The problem is that the nodes do not align uniformly with the circumference of the circular structures. Rather, the intersection of the circular structure and the isogrid is often somewhere along the length of a rib but not at the end of a rib and, therefore, not at a node. Accordingly, individual ribs must be faceted to the circular structure or false nodes must be added where the partial rib intersects with the circular structure. In either case, more structure is added, more weight is added and the performance of the isogrid is less than optimal. In addition, more design and manufacturing work is needed and labor costs increase due to additional faceting required for adding false nodes. FIG. 1 also illustrates how an isogrid intersects with a circular structure. As is readily apparent, very few nodes are located where the isogrid intersects with the outer circular structure. Although not shown in FIG. 1, isogrids similarly do not uniformly intersect with an inner circular structure at a node. At each location where a partial rib intersects the outer or inner circular structure, false nodes will need to be added in order to meet and maintain a structural design criteria.

One solution to the problem of interconnecting concentrically oriented circular structures is to utilize an orthogrid, which is a variant of the isogrid. An orthogrid uses rectangular rather than triangular openings. An orthogrid for circular structure is typically constructed in a radial pattern with a series of rectangles formed by radial and intersecting ribs increasing in area moving from the inner to the outer circular structure along an outwardly extending radial line. An orthogrid can be easier to manufacture and design than an isogrid, especially with circular structure, but an orthogrid is not isotropic in that it has different properties from different directions. An image of an orthogrid interconnecting two circular structures is shown in FIG. 2. As can be seen, the rectangles increase in size from the inner to the outer diameter. As a result, the ribs may need to be increased in size or shape at an outer radial position depending upon the intended loading.

SUMMARY

The foregoing problems are overcome by use of a new adaptable grid or lattice structure identified by the coined term "polargrid." A polargrid may be designed or engineered to fill any space between two generally circular structures and where the ribs will intersect with both circular structures at a node. The intersection of a polargrid with a circular structure will not occur mid-rib. Rather, a polargrid can be designed to always have ribs terminate at an inner or outer circular structure at a node. One embodiment of a polargrid is shown in FIGS. 3 and 4. FIG. 4 illustrates the polargrid of FIG. 3 interconnecting two concentric circular structures. The polargrid was conceived for use with spacecraft. However, it may be used in other situations to interconnect two circular structures. For example, between the hulls of a submarine. In some embodiments, the inner circular structure may be a relatively small area, comprising very few or even a single node. The interconnected circular structures may or may not be co-planar. For example, the polargrid may be a dome or conical shape as illustrated in FIGS. 43-48.

In one embodiment, the polargrid structure comprises an inner and outer circular structure that are generally co-planar, a like number of nodes located at each inner and outer circular structure, a pair of curved spiral stringers extending from each node and interconnecting with separate nodes on the opposite circular structure, a node formed at each location where spiral stringers intersect, and one or more generally circular hoop stringers positioned between the inner and outer circular structures interconnecting nodes equally radially positioned from the inner or outer circular structures. This structure forms a plurality of circular rows of generally equilateral shaped triangles formed between the inner and outer circular structures, with the individual triangles generally decreasing in area from the outer circular structure to the inner circular structure. Each individual triangle is formed by three ribs. One rib is formed by a length of a hoop stringer and is known as a hoop rib. The other two ribs are formed by a length of a spiral stringer and are known as spiral ribs. The inner and outermost circular rows of triangles also have triangles formed by lengths of the inner and outer circular structures.

In a second embodiment, spiral ribs are formed between radially aligned inner and outer nodes. Triangles are formed between adjacent spiral ribs, starting at either the inner circle or outer circle. Triangles are formed keeping the interior angles approximately 60 degrees. The angles for one of the triangles will likely need to vary in order to maintain coincidence between the nodes and the spiral ribs. The process is repeated for adjacent spiral ribs until a completed polargrid is formed.

In an alternative embodiment, in situations where the ribs may be positioned too closely, such as when the inner circular structure has a relatively small diameter, one or more of the innermost hoops may be omitted due to space constraints. In such a situation, for example as illustrated in FIG. 23, the ribs in the innermost circular rows may need to be modified to accommodate additional load. Additional ribs, for example, radially extending ribs, may also be added to accommodate loading.

In a further alternative embodiment, for example as shown in FIG. 49, larger areas of triangles may be omitted to accommodate structure passing through the polargrid. Ribs may be added or remaining ribs may be modified to accommodate particularized loading. In a further embodiment of the present invention, for example as shown in FIGS. 41 and 42, a skin may be added to either or both the upper and lower edges of the ribs for additional strength as may be required by the end use application of the polargrid.

A polargrid may be designed and constructed by a number of different methods. In a first method, an inner circular structure and outer circular structure are defined with an equal number of nodes on each. Each node on the inner circular structure is radially aligned with a node on the outer circular structure. First and second spiral stringers are interconnected to a single node on the inner circular structure. Each spiral stringer has generally the same curved shape. One example is seen in FIG. 6. The angle between the two spiral stringers is between 50 and 70 degrees and most preferably approximates 60 degrees. One example is seen in FIG. 7. The opposite ends of the two spiral stringers are connected to two separate nodes on the outer circular structure. Additional pairs of spiral stringers are connected to each node on the inner circular structure and separate nodes on the outer circular structure until all of the nodes have two spiral stringers connected thereto. The spacing on the outer circular structure between each pair of spiral stringers connected to a single node on the inner circular structure remains constant. The resulting structure forms a plurality of diamond shaped structures, each generally aligned such that a line extending between the two nodes that are furthest apart is a radial line, to both the inner and outer circular structures. The intersection of the spiral stringers defines a plurality of nodes. Hoop ribs are interconnected between nodes that are the same radial position from the inner and outer circular structures to thereby form generally concentric hoop ribs. The resulting structure comprises one or more circular rows of generally equilateral shaped triangles. One example is shown in FIGS. 12-15. If there are a plurality of circular rows, the area of each triangle in a circular row decreases as the circular rows move closer toward the inner circular structure.

According to a second method, an inner circular structure and outer circular structure are defined with an equal number of radially aligned nodes positioned on each circular structure. Radial lines are drawn between two adjacent nodes on the inner and outer circular structures. One example is shown in FIG. 16. The angle formed by those two radial lines is then bisected and a third radial line is positioned equidistant between the two previously located radial lines. The distance between the two adjacent nodes on the outer circular structure is then determined and that linear length is the length of a hoop rib for the outermost circular row of triangles. For example, see FIG. 17. Moving inwardly toward the inner circular structure, two spiral ribs are then constructed extending from the two nodes on the outer circular structure and terminating at the bisecting radial line. The length of the spiral ribs will be slightly less than the length of hoop rib such that the angle formed between the hoop rib and the two spiral ribs approximates 60 degrees. The same technique is then used to create triangles between each adjacent pair of nodes on the outer diameter circular structure. One example is shown in FIG. 18. The point at which the spiral ribs for each triangle meet creates a plurality of nodes equally radially spaced from the inner and outer circular structures. These nodes are then interconnected by hoop ribs to complete an outermost circular row of triangles. One example is shown in FIG. 19. Additional circular rows of triangles are constructed moving inwardly using the same protocol until the polargrid structure is completed. Examples are shown in FIGS. 19-21.

According to a third method for constructing a polar grid, radial construction lines are formed between radially aligned nodes on an inner and outer circle. Bisecting construction lines are added between the previously formed construction lines. One example is shown in FIG. 25. Starting at a node at the end of a first construction line on either the inner or outer circle, a line is drawn from the node to the next adjacent construction line where the angle between the first construction line and the drawn line determines the length of the drawn line. One example is shown in FIG. 25. The angle should approximate thirty degrees and is adjusted to meet design requirements. A second line is then drawn from the end of the first drawn line to the next adjacent radial construction line at approximately the same angle. One example is shown in FIG. 26. Further lines are drawn in a similar manner until the drawn lines interconnect a node on the inner and outer circles to form a spiral stringer. One example is shown in FIG. 28. The process is repeated from each inner and outer node moving circumferentially around the structure maintaining the overall shape of each spiral rib, recognizing that the angle between each leg may vary between 50 to 70 degrees until all of the spiral stringers are formed. One example is shown in FIG. 30. With the spiral stringers formed, circular hoop ribs are added interconnecting the nodes where the spiral stringers intersect. One example is shown in FIG. 31. The last line segment drawn for each spiral stringer may be tailored such that all of the end points of the final line segments fall coincident with the nodes on the inner or outer circle depending upon the direction of construction.

According to a fourth method for constructing a polargrid, radial ribs are formed between radially aligned nodes on an inner and outer circle. First and second adjacent radial ribs are selected. Starting at an outer or inner node on the first radial rib, a line is drawn from the node to the second radial rib such that the angle between the second radial rib and the drawn line is approximate to sixty degrees. A second line is then drawn from the end of the first line back to the first radial rib at an angle that also approximates sixty degrees. This forms a first substantially isosceles triangle between the adjacent radial ribs. Additional lines are drawn between the adjacent radial ribs to form additional adjacent isosceles triangles moving inwardly or outwardly as the case may be until a radial row of isosceles triangles is formed. One of the triangles may need to vary from pattern to maintain coincidence of the nodes with the radial ribs. The process is repeated for each adjacent pair of radial ribs. In this method, circular hoops are not required. However, as an alternative, an additional radial rib may be added between each existing pair of radial ribs, with the added rib interconnecting radial aligned nodes between the originally formed radial ribs to further strengthen the structure. These supplemental or added radial ribs do not interconnect the inner and outer circles.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

It should be understood that the drawings are not necessarily to scale. In certain instances, details that are not necessary for an understanding of the disclosure or that render other details difficult to perceive may have been omitted. It should also be understood that in some instances, details have been added, such as details relating to methods of construction, including for example construction lines and dimensions, to assist in explaining the methods and structures of the preferred embodiments described herein. It should be understood, of course, that the claimed invention is not necessarily limited to the particular embodiments illustrated herein.

DETAILED DESCRIPTION

Figure 1:
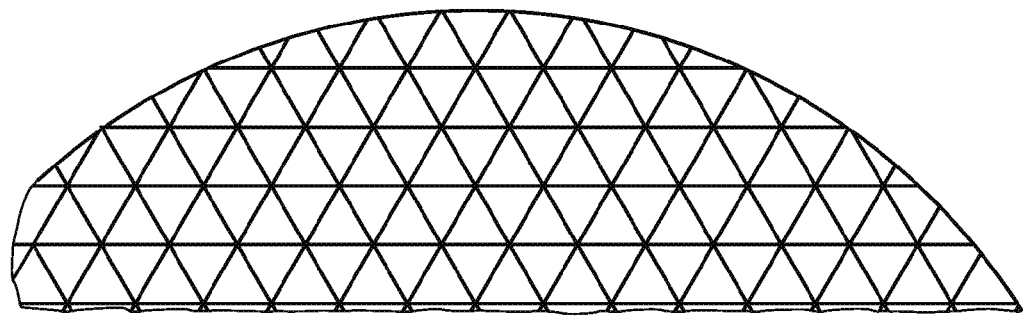
FIG. 1 is a partial view of an isogrid interconnected to an outer circular structure.
Figure 2:
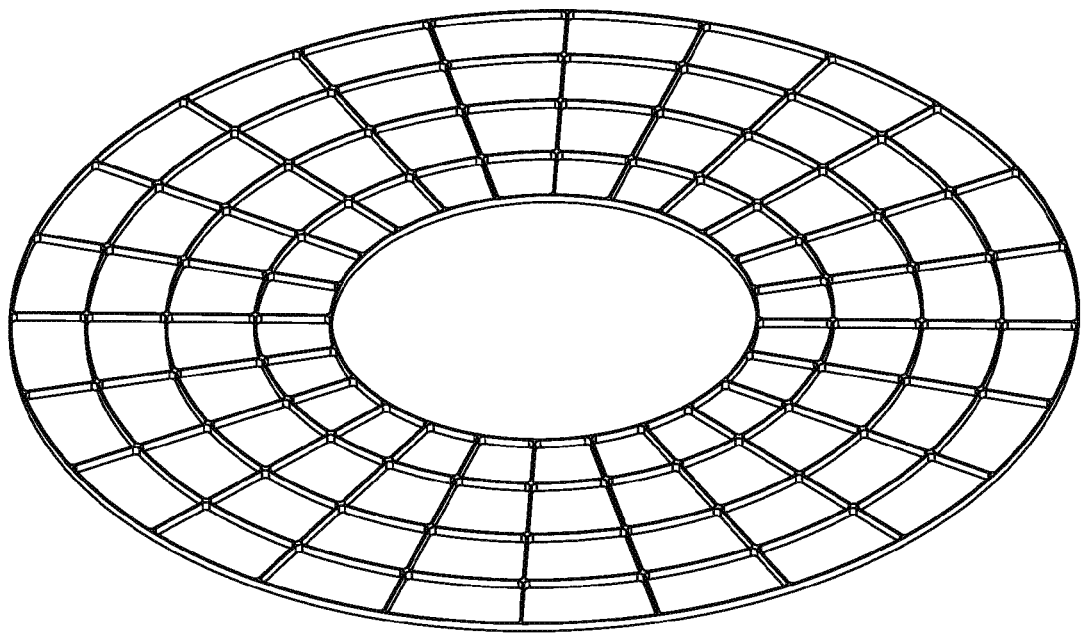
FIG. 2 is a perspective view of an orthogrid interconnecting two circular structures.
Figure 3:
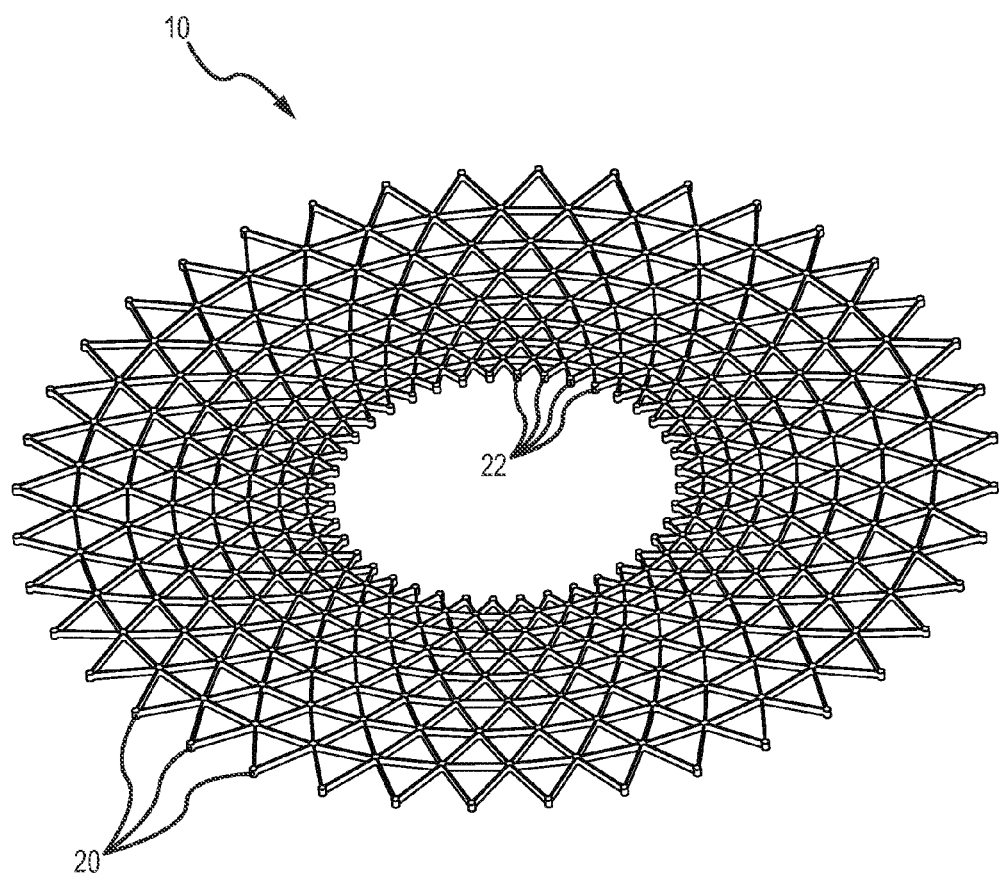
FIG. 3 is a perspective view of one embodiment of a polargrid according to the present invention.
Figure 4:
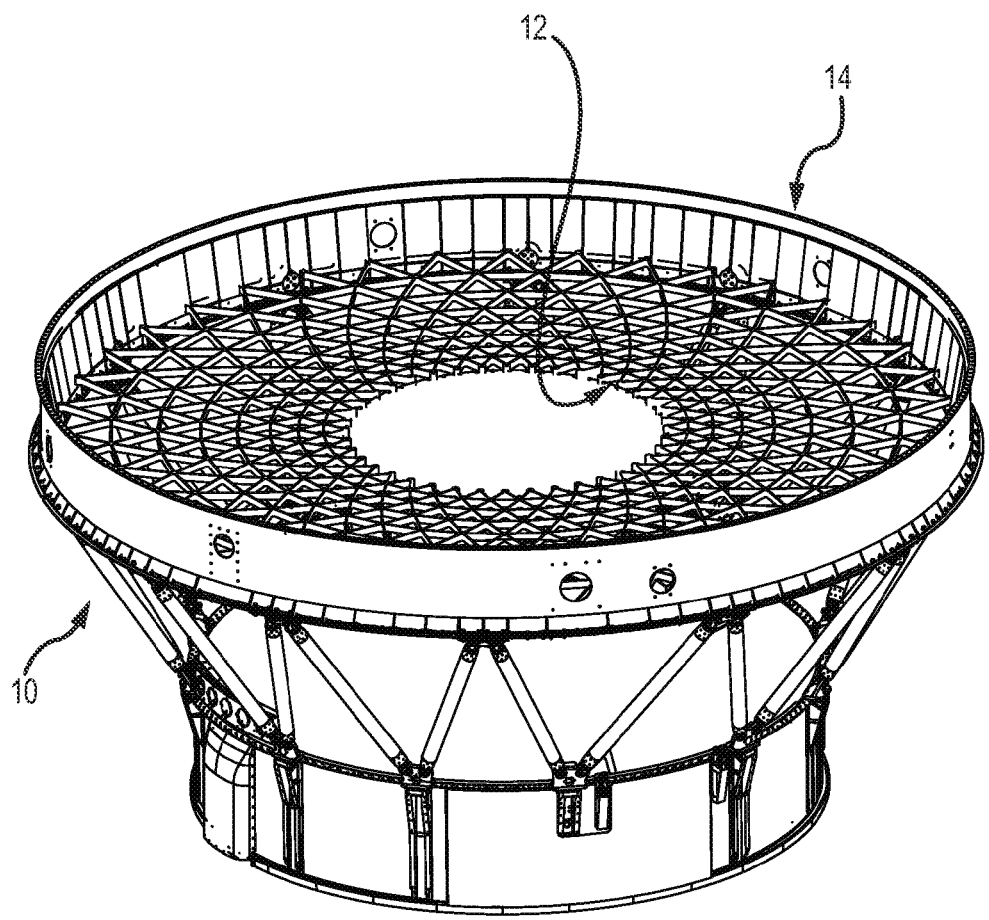
FIG. 4 is a perspective view of the polargrid of FIG. 3 interconnecting two concentric circular structures in a spacecraft.
Figure 5:
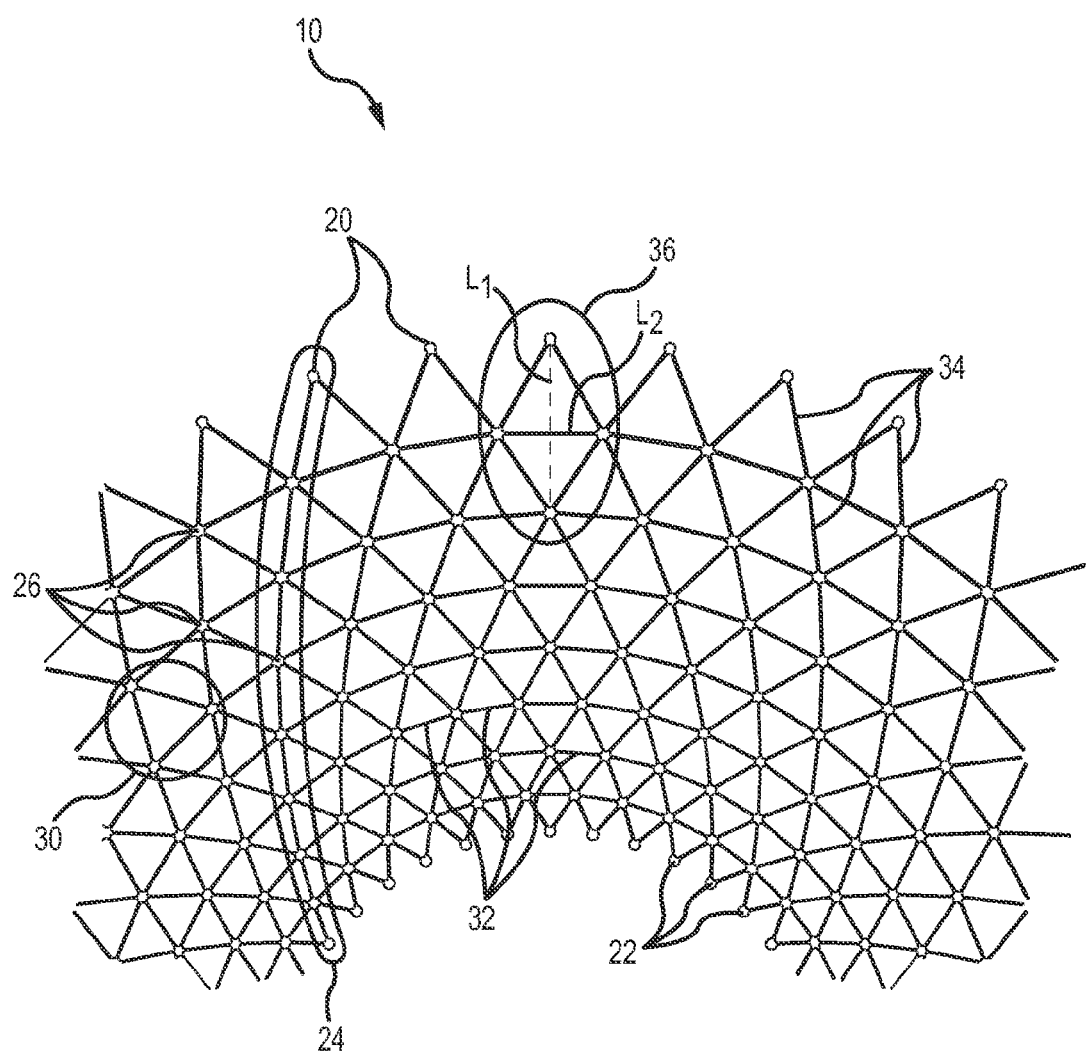
FIG. 5 is a partial top plan view of one embodiment of a polar grid, with accompanying labels.

With reference to FIGS. 3-5, a polargrid 10 comprises a structure that interconnects to two generally circular concentric structures. The inner circular structure 12 may or may not be co-planar with the outer circular structure 14. A plurality of outer diameter nodes 20 are located on or proximate the outer circular structure 14 and a plurality of inner diameter nodes 22 are formed on or proximate the inner circular structure 12. A plurality of spiral stringers 24 extend between the inner diameter nodes 22 and the outer diameter nodes 20. For clarity, examples of spiral stringers 24 are more easily seen in FIGS. 6-10. Nodes 26 are formed at the locations where the spiral stringers 24 intersect. A plurality of hoop stingers 28, generally circular in shape, interconnect nodes 26 of equal radial position relative to the inner and outer diameter nodes. For clarity, the hoop stringers 28 may be more easily seen in FIG. 12. As is illustrated, a number of triangles 30 are formed as a result of this pattern. The individual leg of triangle 30 formed by a portion of a hoop stringer 28 is called a hoop rib 32 and the other two legs of each triangle are formed by a portion of a spiral stringer 24 is called a spiral rib 34. As further shown, a generally diamond shaped polygon 36 is formed by adjacent triangles sharing a common hoop rib 32. In this embodiment, the diamond pattern is oriented such that the greater node to node length is oriented radially. The radial node to node length is denoted $L_1$ and the transverse node to node length is denoted $L_2$, which is the length of a hoop rib 32.

There are numerous ways to design and construct a particular polargrid structure. A number of factors are taken into account. These include the load that will be applied to the structure, both overall and localized due to the placement of particular equipment, the cross-sectional shape of the spiral ribs 34 and hoop ribs 32, whether any open areas will need to be created within the lattice structure for equipment pass-throughs such as conduits and/or cabling, and critical rib buckling margins. Other factors will be known to and appreciated by those of skill in the art upon reading the present disclosure and understanding embodiments of the inventions. More open space or fewer ribs allow better radiative cooling of and reduced vibro-acoustic environments for equipment packages connected to or located adjacent to the polargrid structure. The area of the polargrid structure and the load capacity will vary by application, and the designs of the embodiments described herein may vary to meet the requirements of each application. Increased node spacing generally means less load may be applied to the polargrid, assuming rib size and structure remains constant, but creates a polargrid with a lower triangle density to allow the polargrid to attach to an inner circular structure having a reduced diameter. In constructing a polargrid structure, it is most preferable to maintain the individual triangles 30 in the general form of an equilateral triangle, although the inner angles may vary as required by the application. Generally speaking, the inner angles in the triangles may vary between approximately 50 and 70 degrees.

Figure 6:
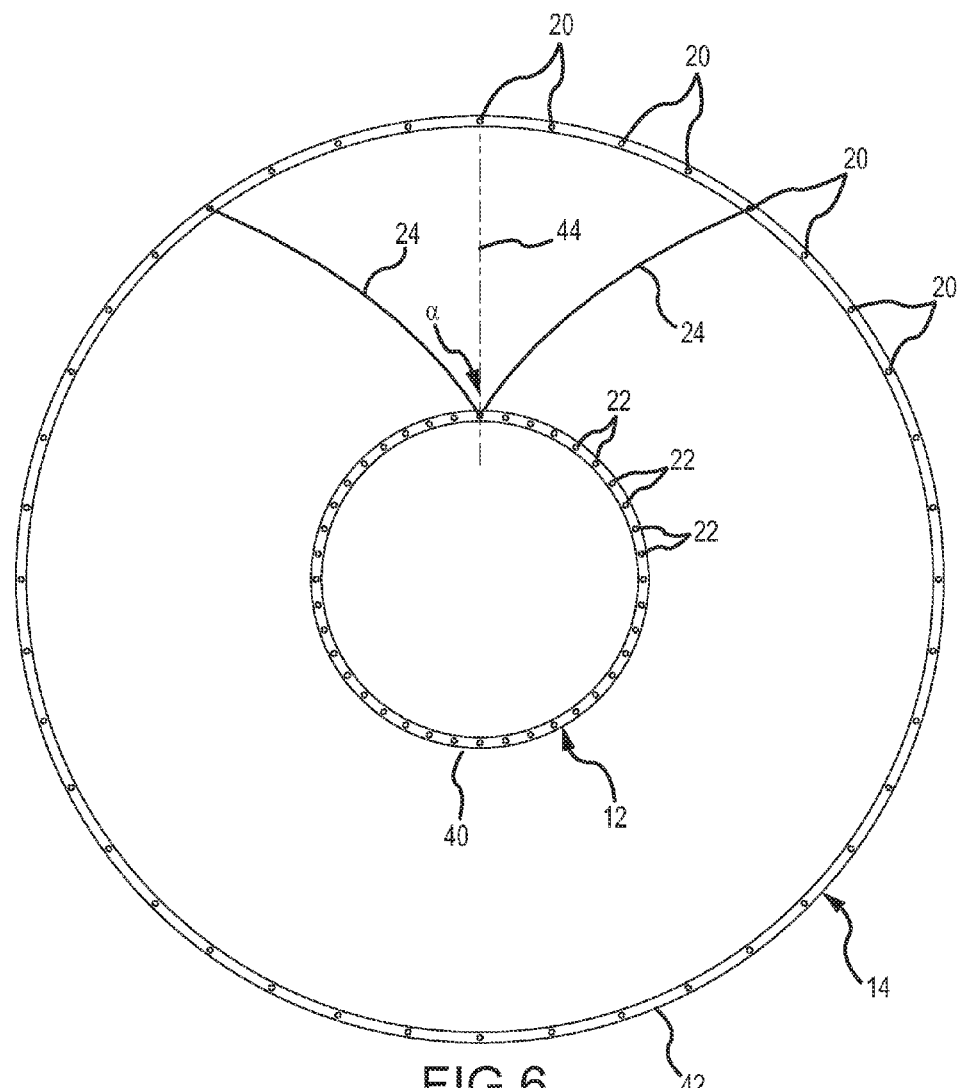
FIG. 6 is a top plan view of two spiral ribs interconnecting separate nodes of an outer circular structure to a common inner node of an inner circular structure.
Figure 7:
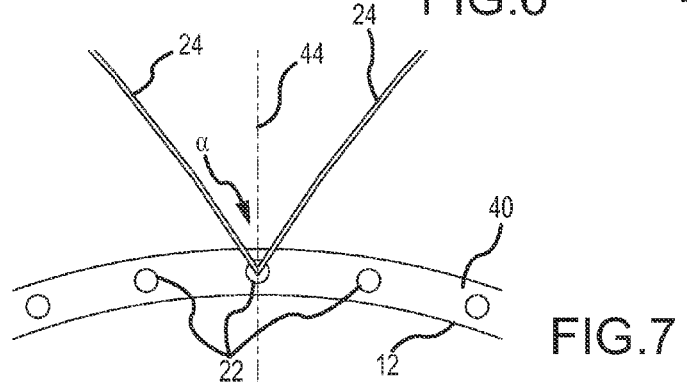
FIG. 7 is an enlarged view of the inner diameter node and spiral ribs shown in FIG. 6.
Figure 8:
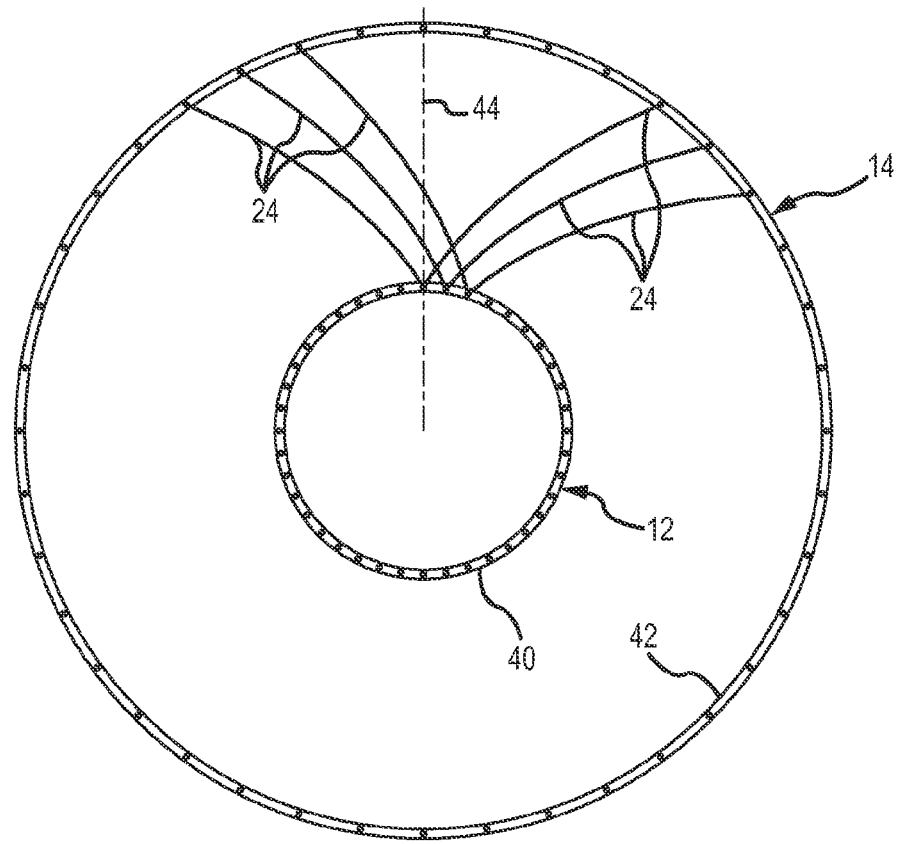
FIG. 8 is a top plan view of the embodiment of FIG. 6 with four additional spiral ribs added to the structure.
Figure 9:
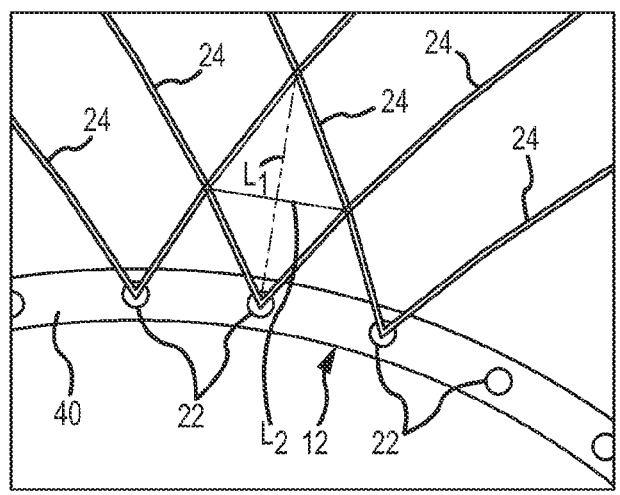
FIG. 9 is an enlarged view of the inner circular structure, inner nodes and spiral stringers of FIG. 8.
Figure 10:
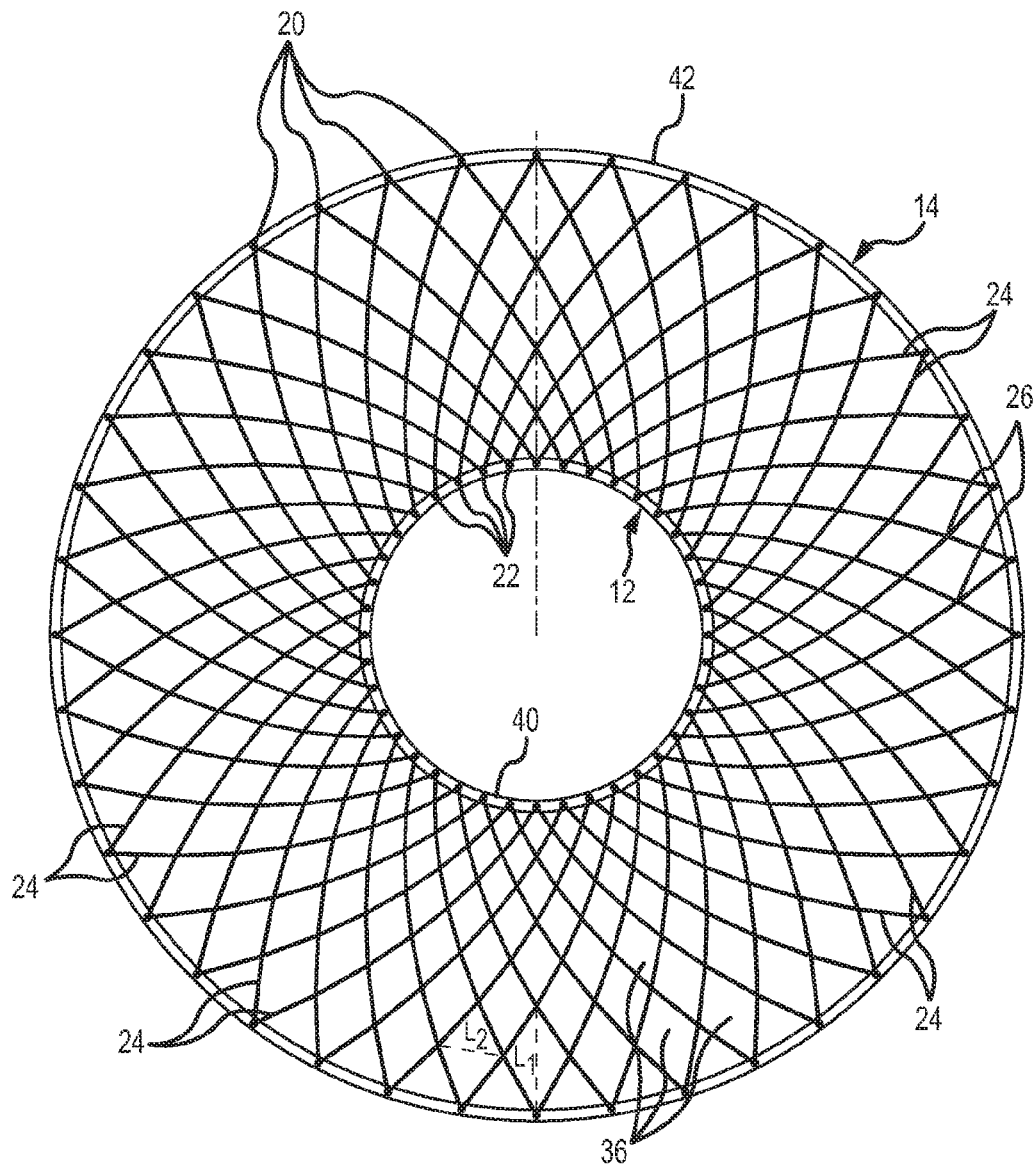
FIG. 10 is a top plan view of the embodiment of FIG. 6, further illustrating a full complement of spiral stringers extending between the inner circular structure and the outer circular structure for a polargrid having 40 inner and outer nodes.
Figure 11:
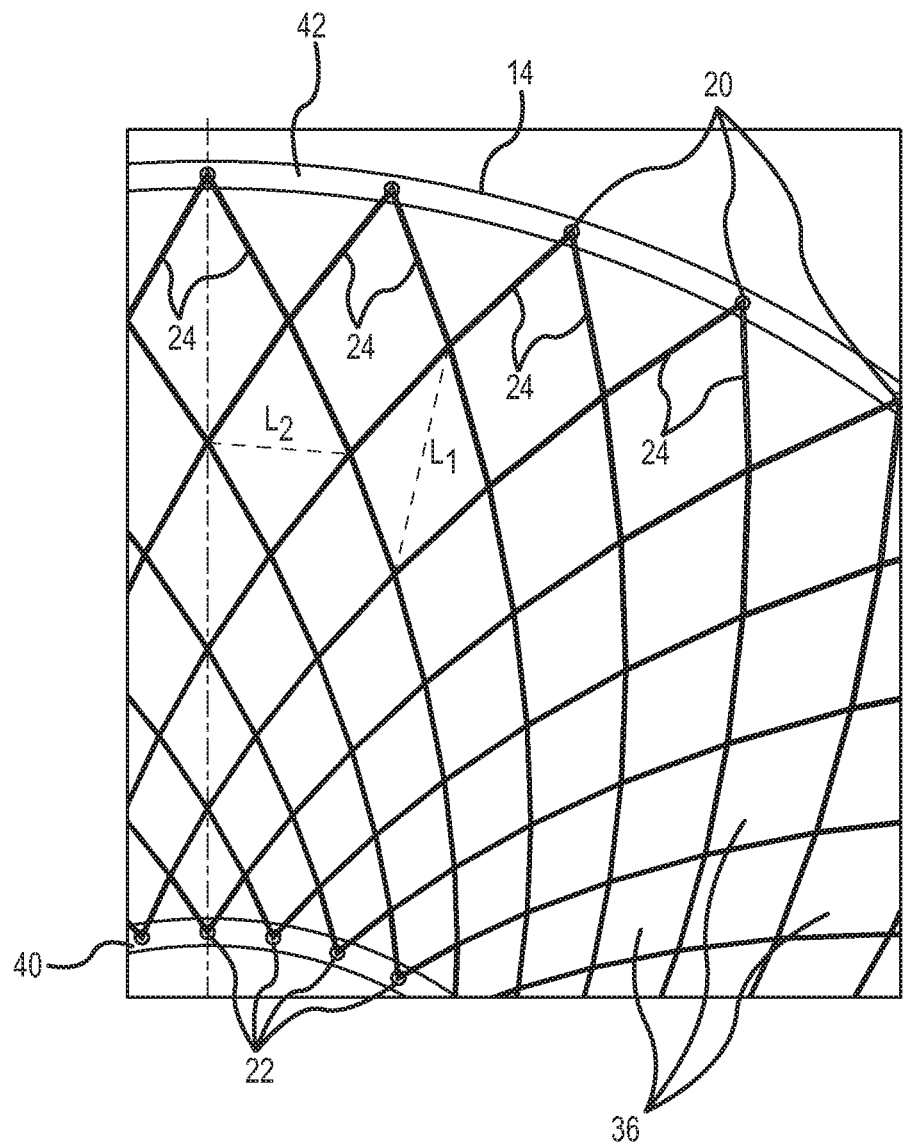
FIG. 11 is an enlarged view of a portion of the embodiment of FIG. 10.
Figure 12:
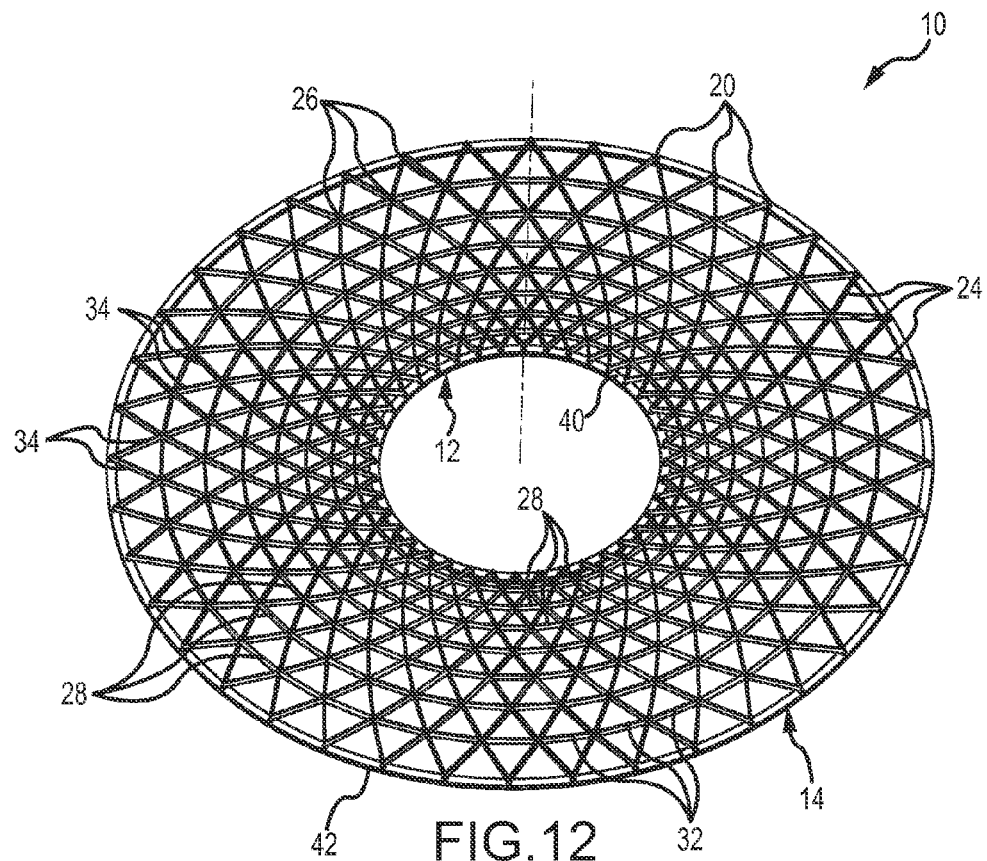
FIG. 12 is a top perspective view of the embodiment of FIG. 10, further showing circular hoops connecting nodes formed at the intersection of spiral stringers of the embodiment shown in FIG. 10.
Figure 13:
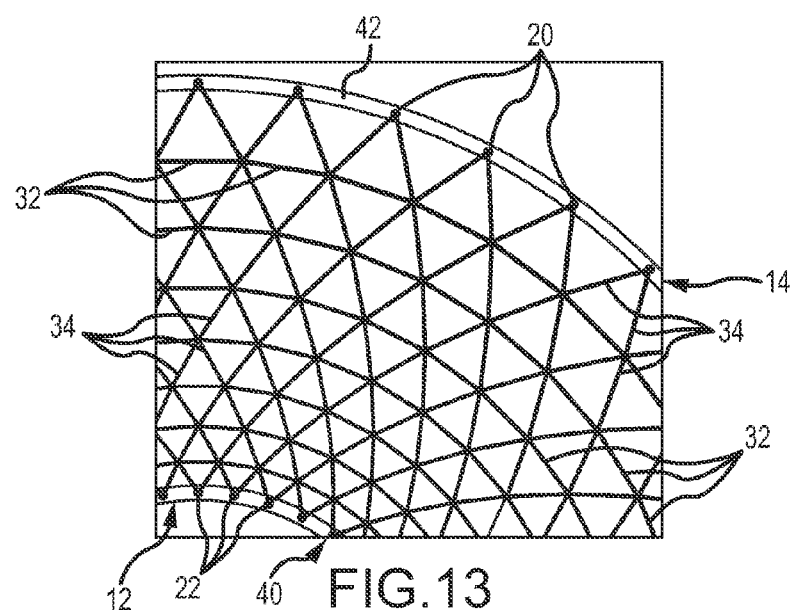
FIG. 13 is an enlargement of a portion of the structure shown in FIG. 12.
Figure 14:
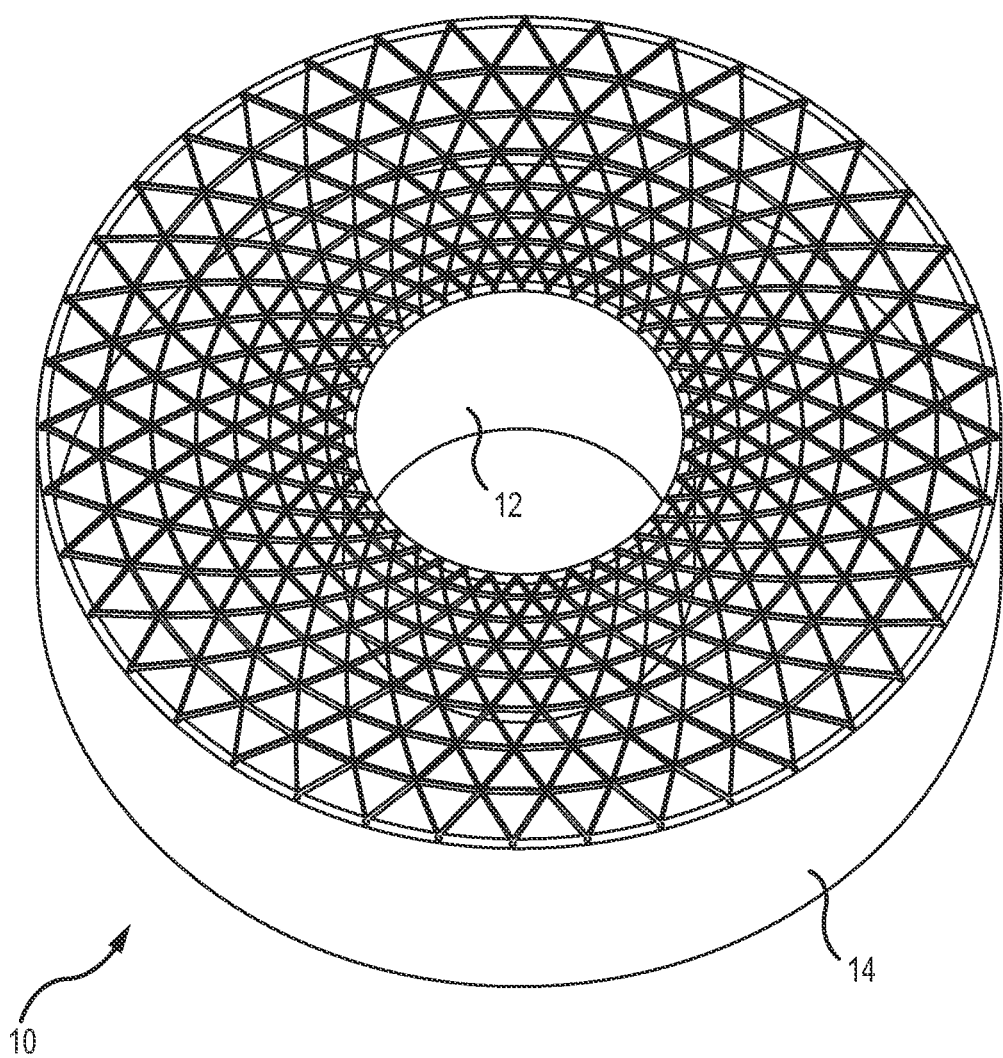
FIG. 14 is a top perspective view of a polargrid made according to the present invention and interconnecting two circular structures.
Figure 15:
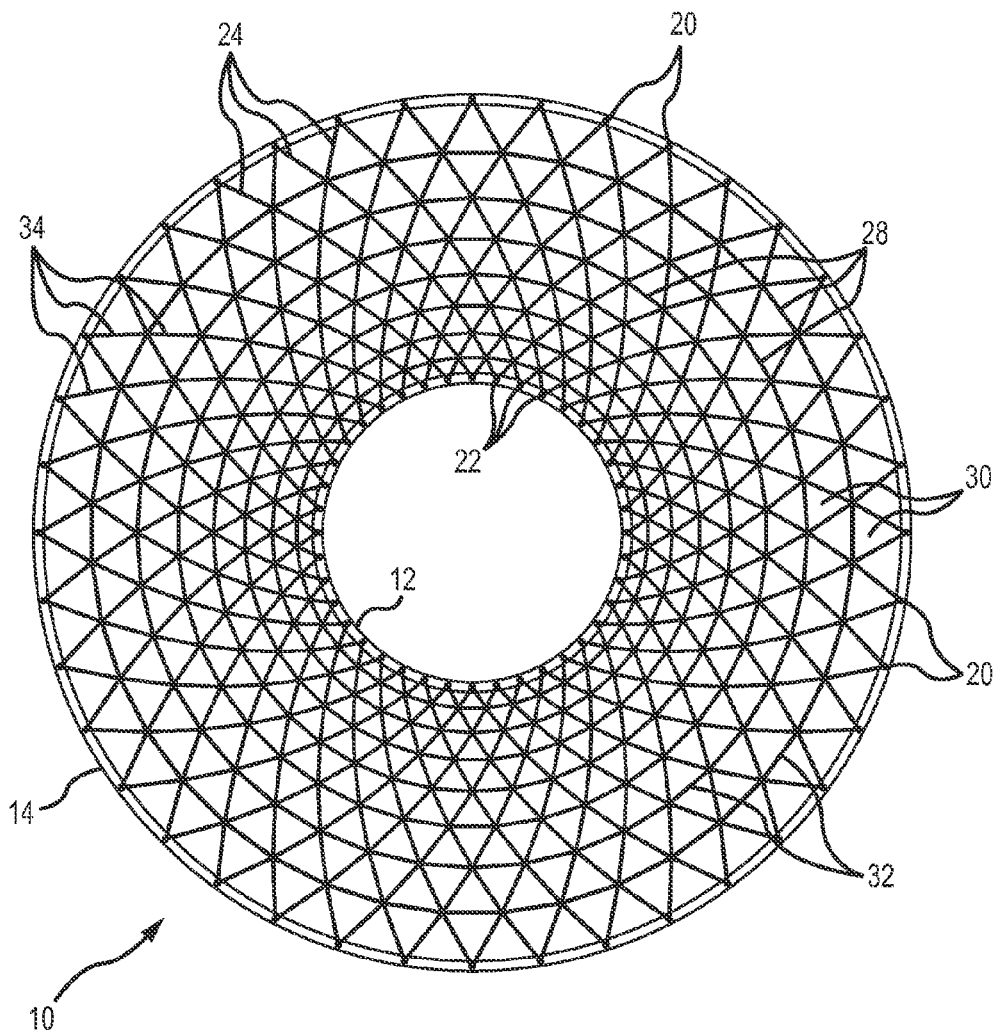
FIG. 15 is a top plan view of the embodiment of FIG. 14.

One method of constructing a polargrid lattice structure will now be described in connection with FIGS. 6-15. As depicted, an inner circle 40 and outer circle 42 represent concentric inner and outer circular structures 12 and 14, structures between which a polargrid structure will be constructed. For purposes of this example, there are forty outer diameter nodes 20 and forty inner diameter nodes 22. Line 44 in FIGS. 6-8 illustrates that an inner and outer node are radially aligned. In FIG. 6, two spiral stringers 24 are shown connected to a single inner node 22. The angle alpha (α) separating the spiral stringers 24 at the inner node 22 is approximately 67 degrees. Any angle near 60 degrees may be selected to allow a change in the size or shape of the grid lattice. Each spiral stringer 24 has the same variable radius spiral curvature that originates from the coaxial center of the inner and outer circles 40 and 42. Recognizing that an inverse relationship exists between angle α and the ratio of L1/L2, angle α may be varied from 60 degrees to tailor the L1/L2 ratio, and thereby the resultant aspect ratio of the diamond patterns 36, as appropriate to satisfy design requirements. Preferably angle α will be between approximately 50 degrees and 70 degrees. Alternatively, although not shown, the angle α may approach 180 degrees. In FIGS. 8 and 9, additional spiral stringers 24 have been added to adjacent inner nodes 22. Because there are 40 inner and outer nodes 20 and 22 in this example, each node is separated from adjacent nodes by a 9 degree angle. As more easily seen in FIG. 9, the diamond pattern 36 is positioned with the larger node to node distance $L_1$ oriented radially. As shown in FIG. 10, the remaining spiral stringers 24 are added to each of the inner nodes resulting in a spiral rib pattern formed by the spiral stringers 24. The location at which two spiral stringers 24 intersect forms a node 26. As illustrated in FIGS. 12 and 13, individual hoop ribs 32 are connected between the nodes 26 that are at the same radial position from either the inner circle 40 or outer circle 42. Adjacent hoop ribs 32 interconnect to define hoop stringers 28. Adjacent hoop stringers 28 define circular rows 48. As shown, there are 8 circular rows 48 formed by adjacent hoop stringers 28 and interconnecting the spiral stringers 24. As best seen in FIG. 13, each triangle 30 is formed by two spiral ribs 34 and a hoop rib 32. FIGS. 14 and 15 show a completed polargrid interconnecting two circular structures.

Figure 16:
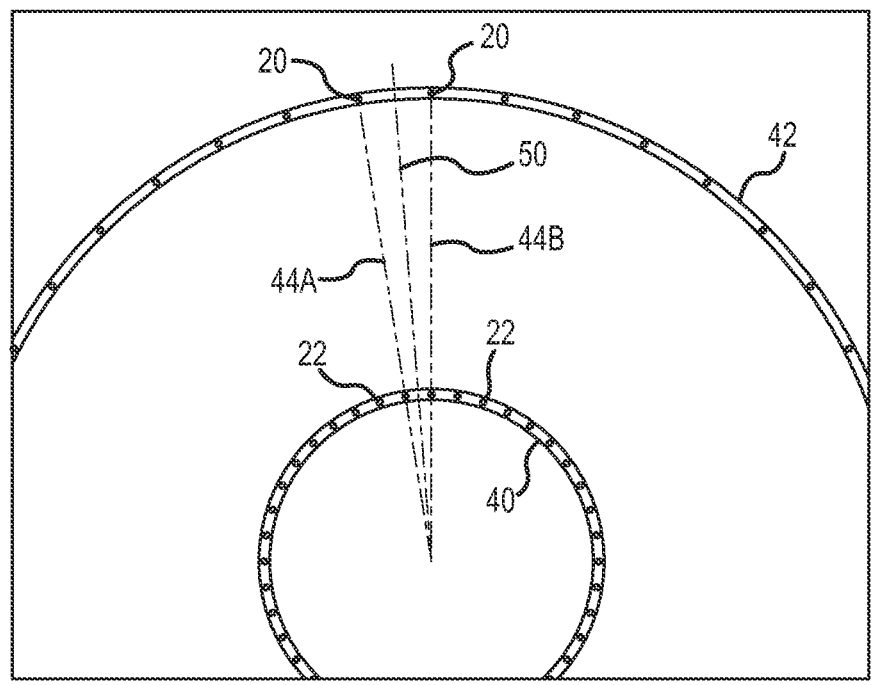
FIG. 16 is a partial top plan view of an inner and outer circular structure with two radial lines drawn between radially corresponding inner nodes and outer nodes and a third radial line bisecting the angle between the two radial lines.
Figure 17:
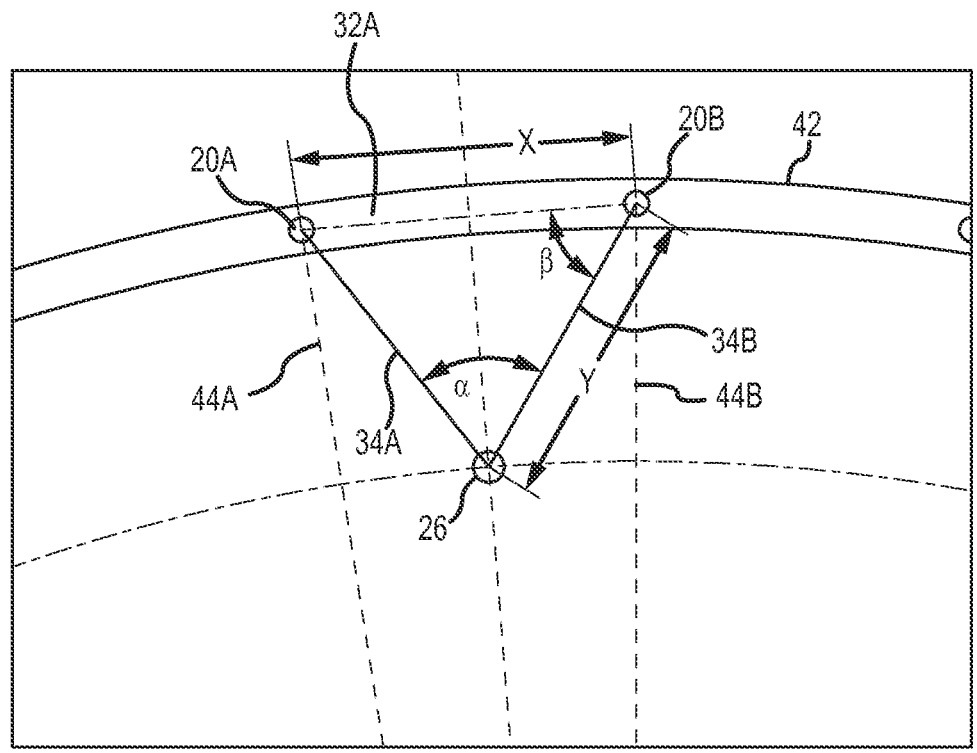
FIG. 17 is an enlarged view of a single triangle formed according to one method of the present invention.

A second method of constructing a polargrid structure will now be described with reference to FIGS. 16-21. As illustrated in FIG. 16, an inner circle 40 and outer circle 42 define generally concentric structures between which the polargrid structure will be connected. A polargrid will also work with slightly non-concentric structures, but will require additional design effort for implementation. A first radial line 44A and a second radial line 44B interconnect aligned adjacent outer nodes 20 and inner nodes 22. A further radial line 50 bisects the two radial lines 44A and 44B. Starting at the outer circumference or outer circle 42, circular rows 48 are formed moving radially inwardly until the polargrid is completed. One could also start at the inner circumference and work outwardly. The anticipated load to be applied to the polargrid will determine a minimum number of outer nodes 20. Turning to FIG. 17, the number of outer nodes 20 will determine the length of the individual hoop ribs 32 at the outer diameter. The line 32A represents a hoop rib interconnecting outer nodes 20A and 20B. Because the triangle 30 is intended to approximate an equilateral triangle, the length of the hoop rib 32A then controls the length of the spiral ribs 34A and 34B.

Figure 18:
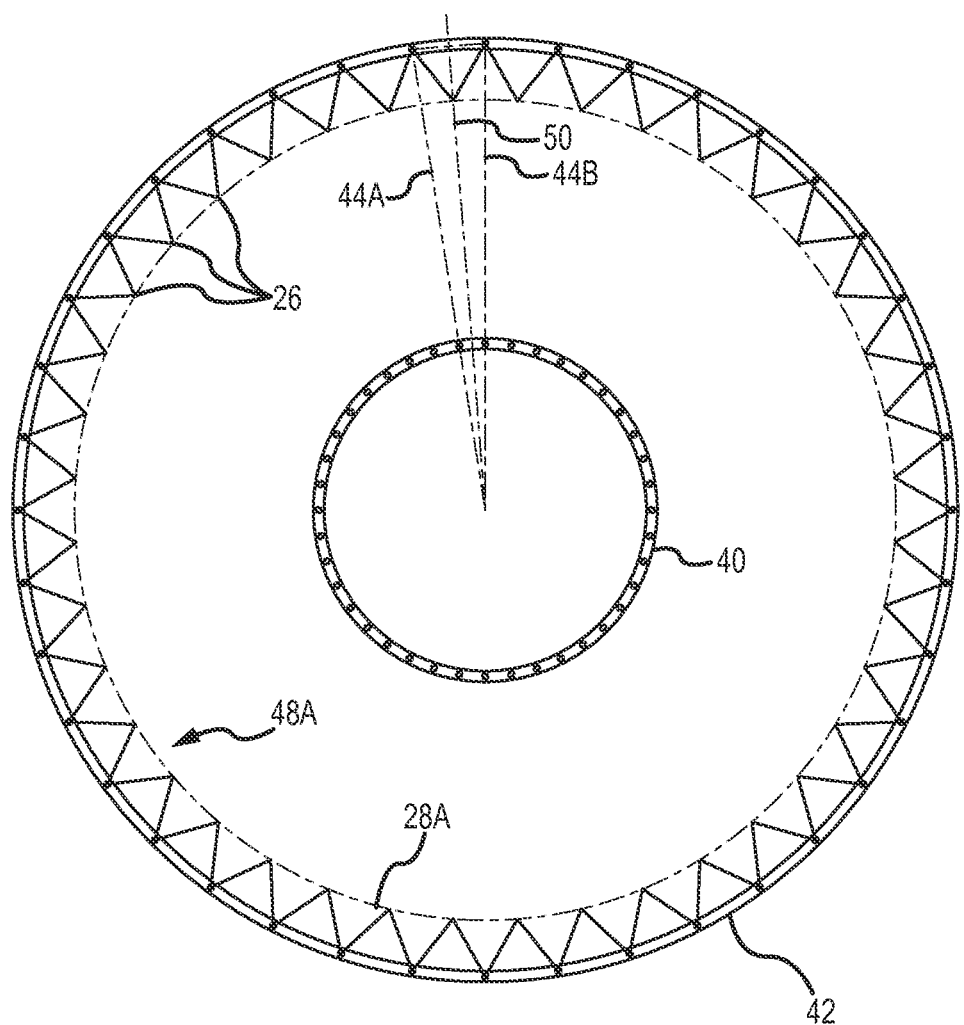
FIG. 18 is a top plan view of a fully completed outer circular row according to a first method of the present invention.

As shown in FIG. 17, two outer nodes 20A and 20B are illustrated. As a first step, the distance between nodes 20A and 20B is measured. The linear length X between nodes 20A and 20B is the length of a hoop rib 32A. The length of each spiral rib 34 will be the same as or a fraction of the length of the hoop rib. When constructing circular rows 48, the distance between each pair of adjacent nodes will be X. The length of a spiral rib 34 can be less than, equal to, or greater than X. For load critical areas and a more isotropic structure, the length of the spiral rib 34 is set equal to or close to X. If the length of a spiral rib 34 is set greater than X a larger L1/L2 ratio will elongate the diamond pattern 36 in a more radial direction, thereby creating a structure stiffer in the radial direction and softer in torsion/shear. If the length of the spiral ribs 34 is less than X, the L1/L2 ratio will decrease to make the structure stiffer in torsion/shear but softer in the radial direction. In this example, a 0.95 factor is used to determine Y, such that Y is 95% the length of X. This factor should preferably approach 1 to minimize deviation for forming equilateral triangles 30 where the angles are approximately 60 degrees between ribs. As shown in FIG. 17, spiral ribs 34A and 34B are approximately 95% of the length between nodes 20A and 20B (0.95X). When the triangle 30 is constructed, the angle alpha ($\alpha$) between the two spiral ribs 34A and 34B approaches 60 degrees. In this particular example, a is approximately 63.5 degrees. The remainder of the triangles 30 in the outer circular row are constructed in the same manner. The result is shown in FIG. 18. As a result, a first hoop stringer 28A may be formed by interconnecting nodes 26. The outer circular structure may also be considered a hoop stringer, in which case it would be the first hoop stringer 28A and the reference in FIG. 18 to first hoop stringer 28A would then be changed to second hoop stringer 28B.

Figure 19:
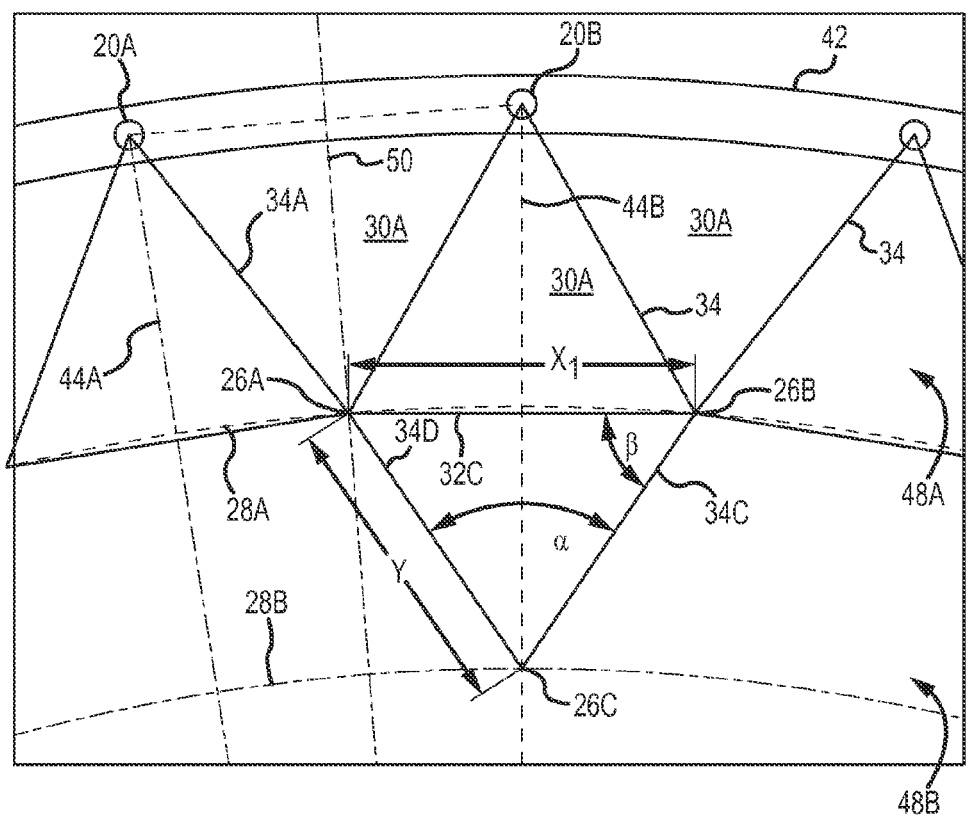
FIG. 19 is an enlarged view of a triangle formed in a second circular row of the embodiment shown in FIG. 18.

FIG. 19 illustrates the construction of the next innermost circular row 48B. Nodes 26A and 26B are formed by adjacent triangles 30A. These nodes 26A and 26B define a distance $X_1$ which is the length of a hoop rib 32C in the new circular row 48B. In this example, a factor of 0.97 is utilized for calculating the length Y of a spiral rib 34. Accordingly, the length of spiral ribs 34C and 34D is 0.97X. The angle beta $\beta$ between hoop rib 32C and spiral rib 34C approaches 60 degrees, and in this example is approximately 59 degrees. The angle alpha ($\alpha$) between spiral ribs 34C and 34D approaches 60 degrees and in this example is approximately 62 degrees. The second circular row 48B is completed by constructing adjacent triangles in the same manner as constructing triangles to form the first circular row 48A. As a result, nodes 26C and 26D are created which, in turn, define the formation of a third hoop stringer 28B.

Figure 20:
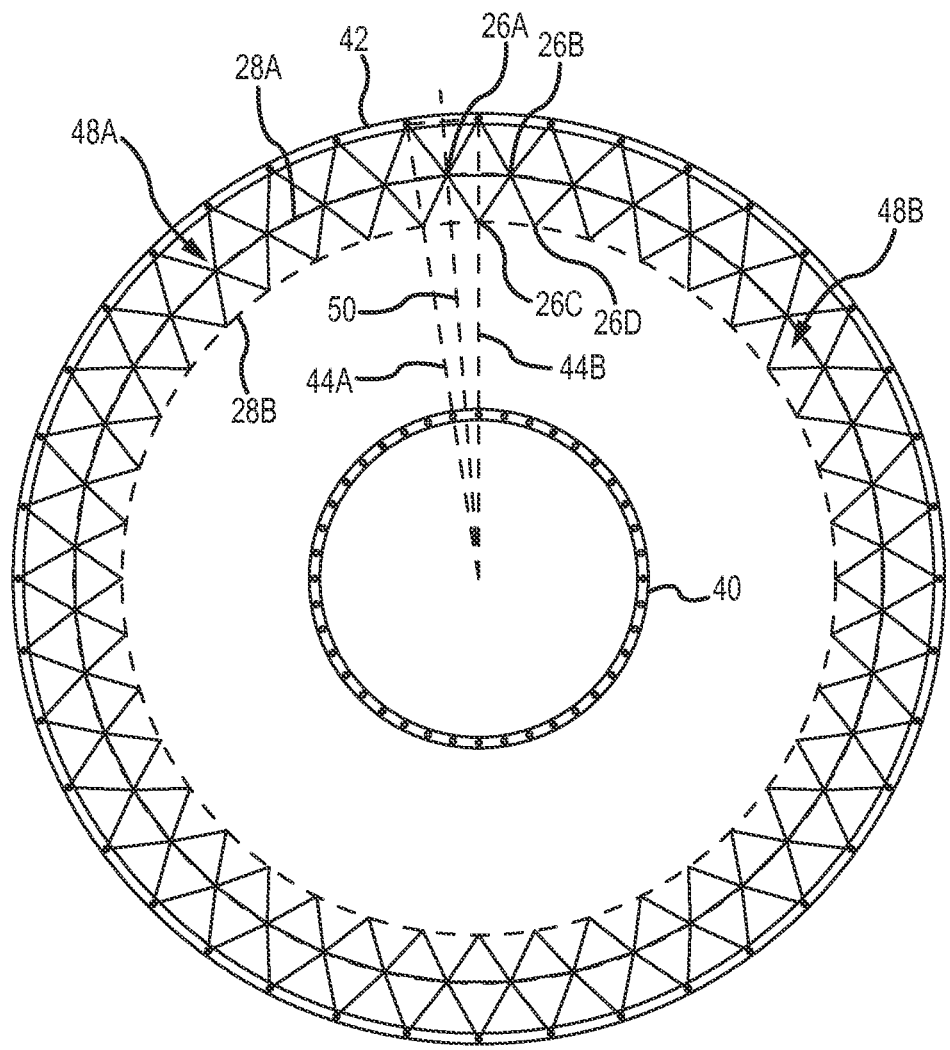
FIG. 20 is a top plan view of the embodiment of FIG. 18, further showing a second circular row adjacent and inward of the first circular row depicted in FIG. 18.
Figure 21:
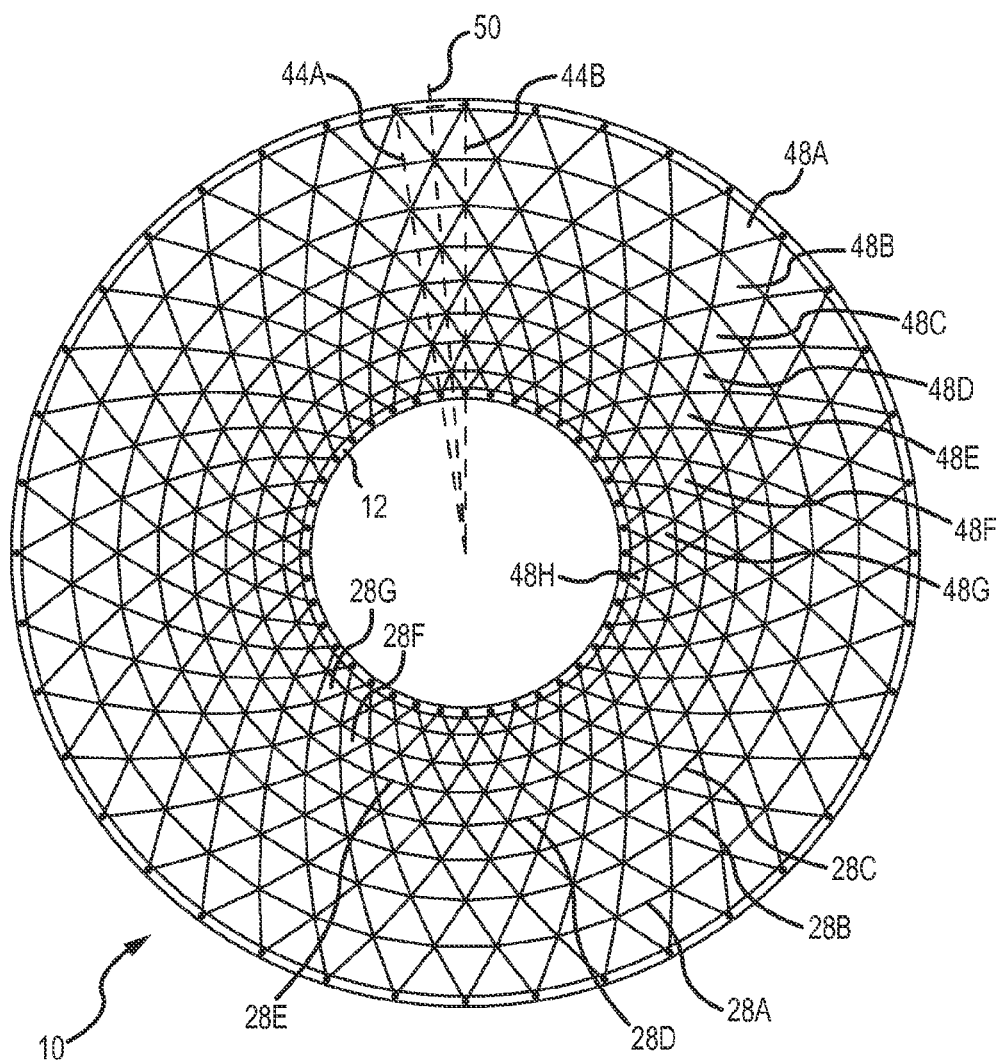
FIG. 21 is a top plan view of a completed polargrid interconnecting an inner and outer circular structure according to a first method of the present invention.

FIG. 20 discloses a polargrid having a first circular row 48A and a second circular row 48B. As should be appreciated, additional circular rows are constructed until the polargrid is completed as is shown in FIG. 21. The innermost circular row 48H is completed by constructing the inner circular structure 12 at the innermost diameter. To ensure all spiral stringers and hoop nodes are coincident, the next closest circular rows are adjusted by tailoring the multiplication factor for X until the innermost circular row 48 defines triangles 30 that adequately approximate equilateral triangles. The coincidence achieved in this example relates to having the inner and outer nodes in perfect radial alignment. If such radial alignment is not desired or required by design, then tailoring the angle can be omitted since the spiral stringers will intersect any radius. As should be appreciated to those of skill in the art, this construction process may be programmed using known equations.

Figure 22:
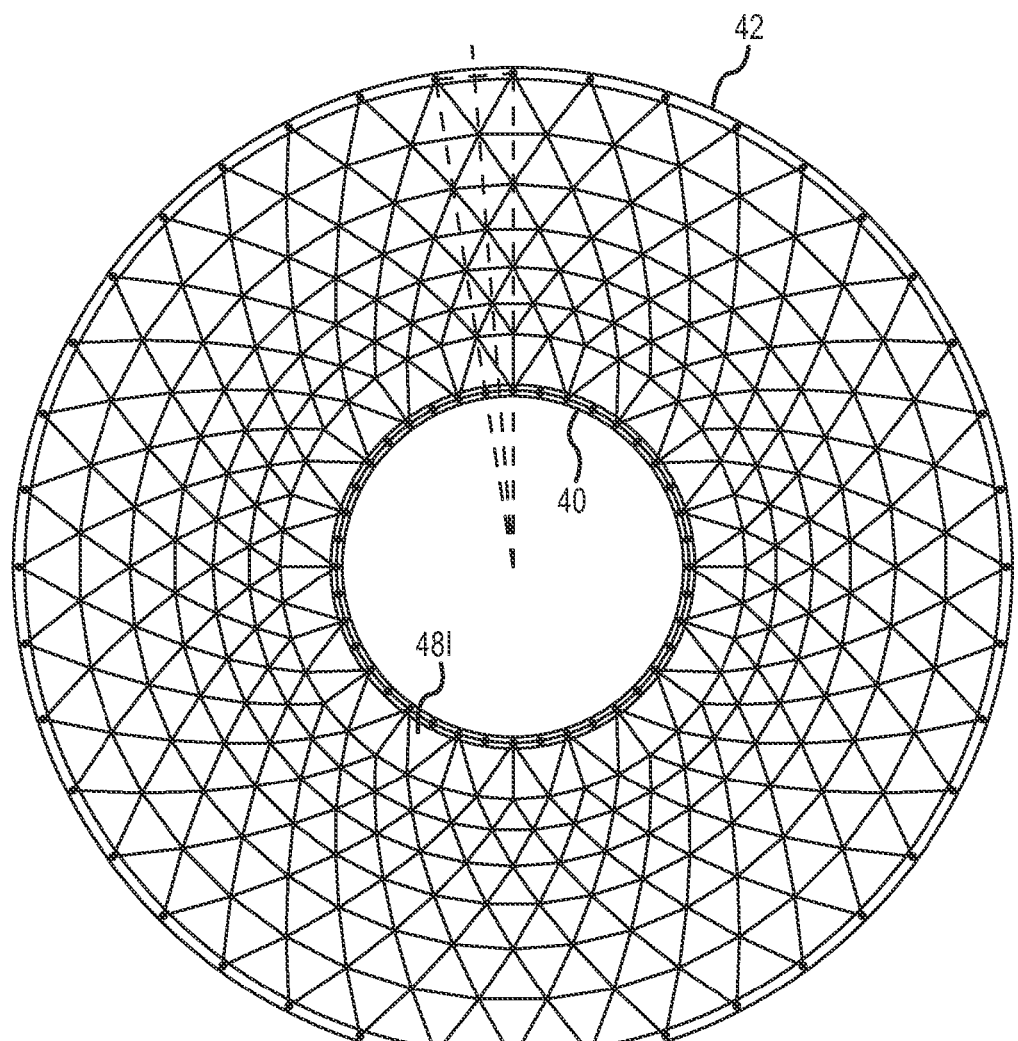
FIG. 22 is an alternative embodiment of that shown in FIG. 21, wherein the two innermost circular rows are removed and replaced with an alternative design.
Figure 23:
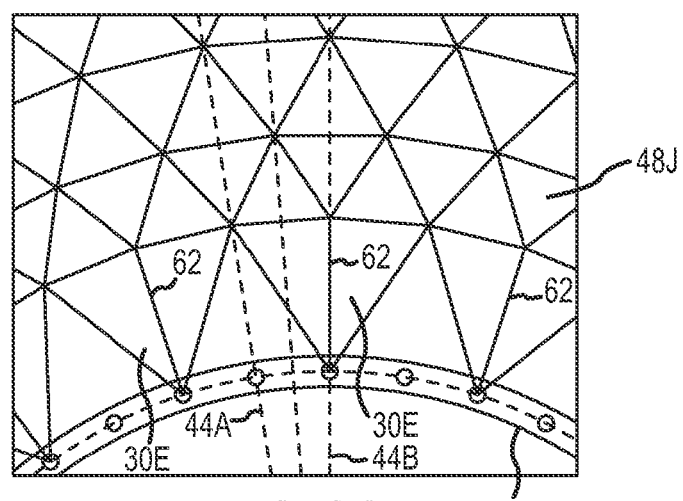
FIG. 23 is a partial enlarged view of the innermost circular rows of the embodiment depicted in FIG. 22.

In some circumstances the nodes at the innermost diameter may become too densely packed, particularly if the diameter of the inner circular structure 12 is relatively small. As shown in FIG. 22, embodiments of the present design are flexible. For example, every other inner diameter node 22 may be skipped in the formation of the innermost circular row 48I. In this manner, generally equilateral triangle construction is still maintained. As illustrated best in FIG. 23, triangles 30E approximate equilateral triangles. As a further option, depending upon the load to be received by the polargrid structure, radial ribs 62 may be added to distribute loads from spiral stringers in circular row 48J and to further strengthen the innermost circular row 48 or, for that matter, at any location in the polargrid where additional support is needed, such as proximate cut-out portions associated with pass-throughs.

Figure 24:
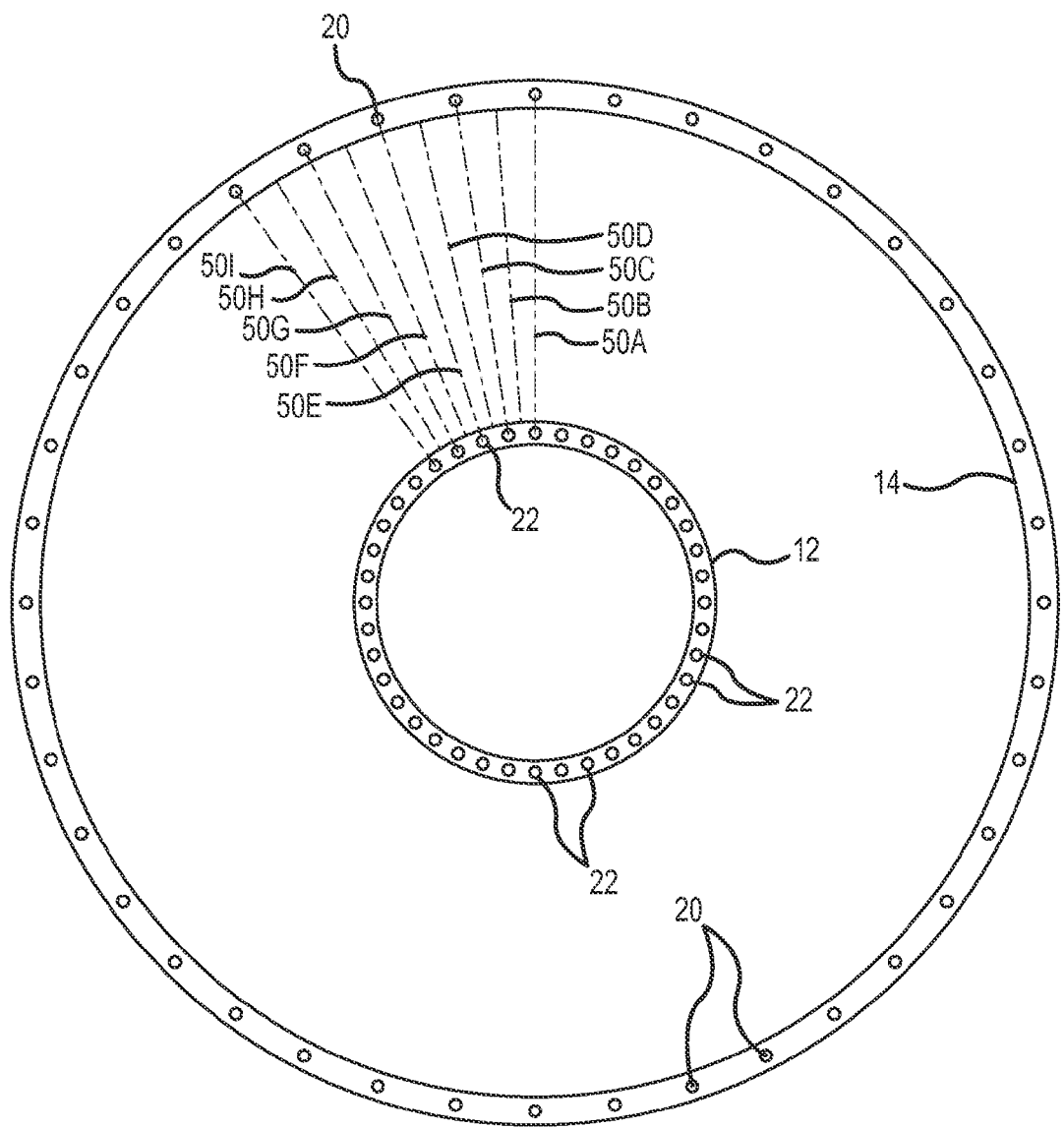
FIG. 24 is a top plan view of an inner and outer circular structure with radial lines interconnecting radially aligned nodes.
Figure 25:
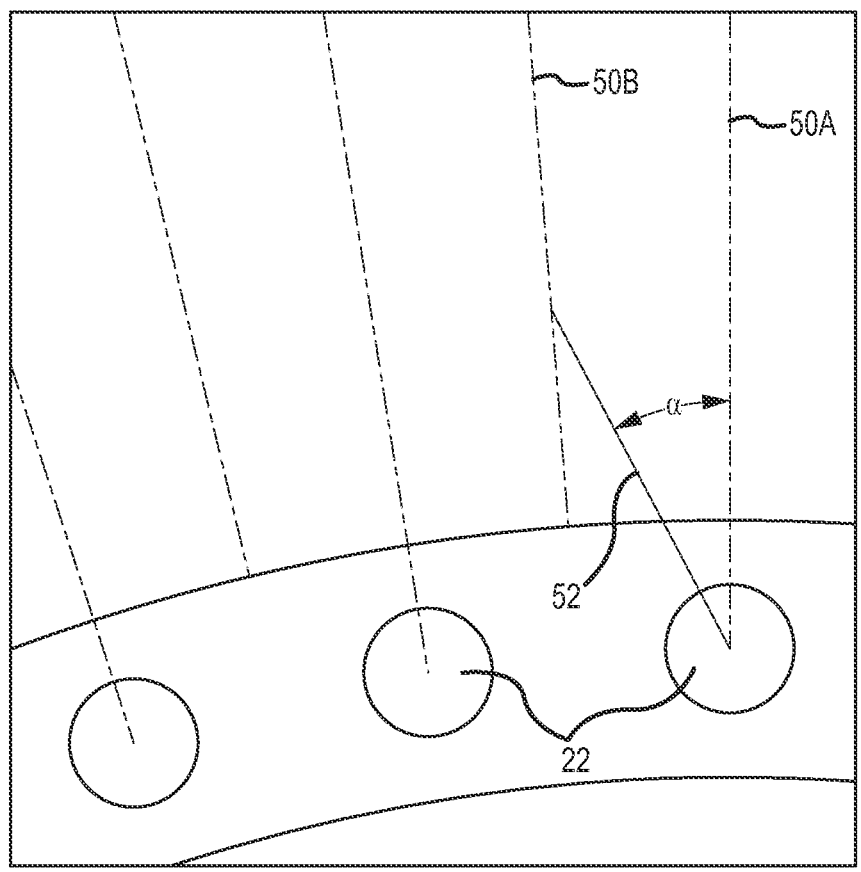
FIG. 25 is an enlarged view of a portion of the inner circular structure of FIG. 24 with the innermost line segment of a spiral rib illustrated interconnecting adjacent radial lines.
Figure 26:
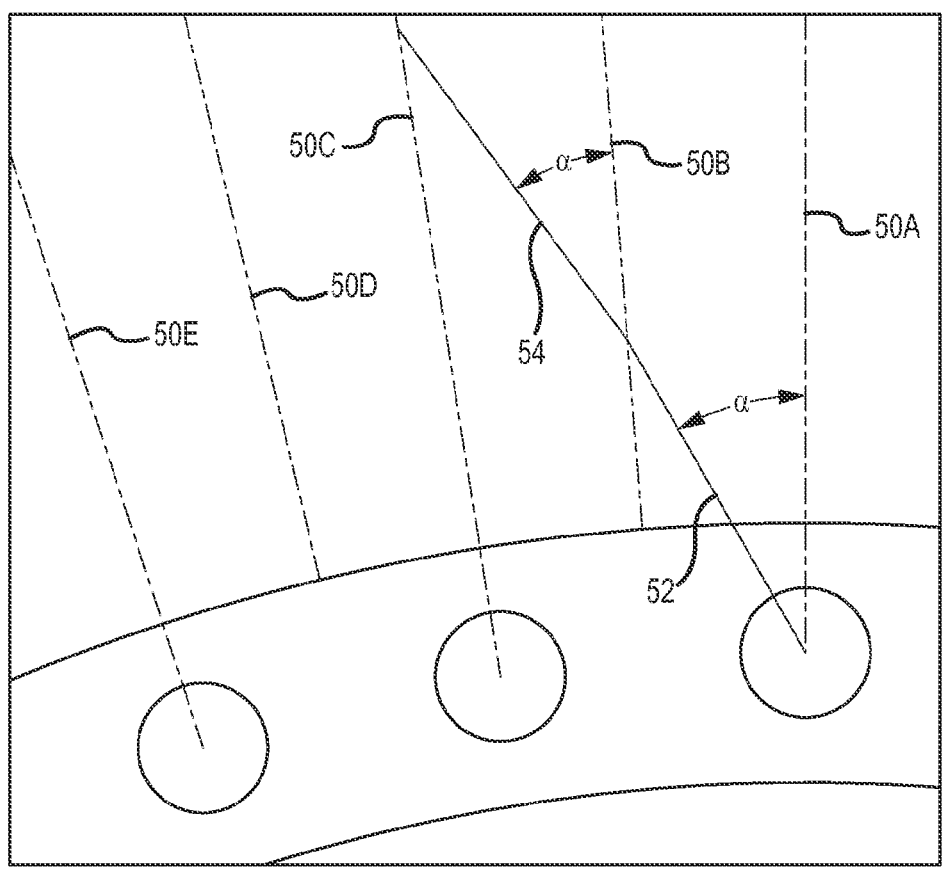
FIG. 26 is an enlarged view of a portion of the inner circular structure of FIG. 24 with a second line segment illustrated interconnecting the first line segment of FIG. 25.
Figure 27:
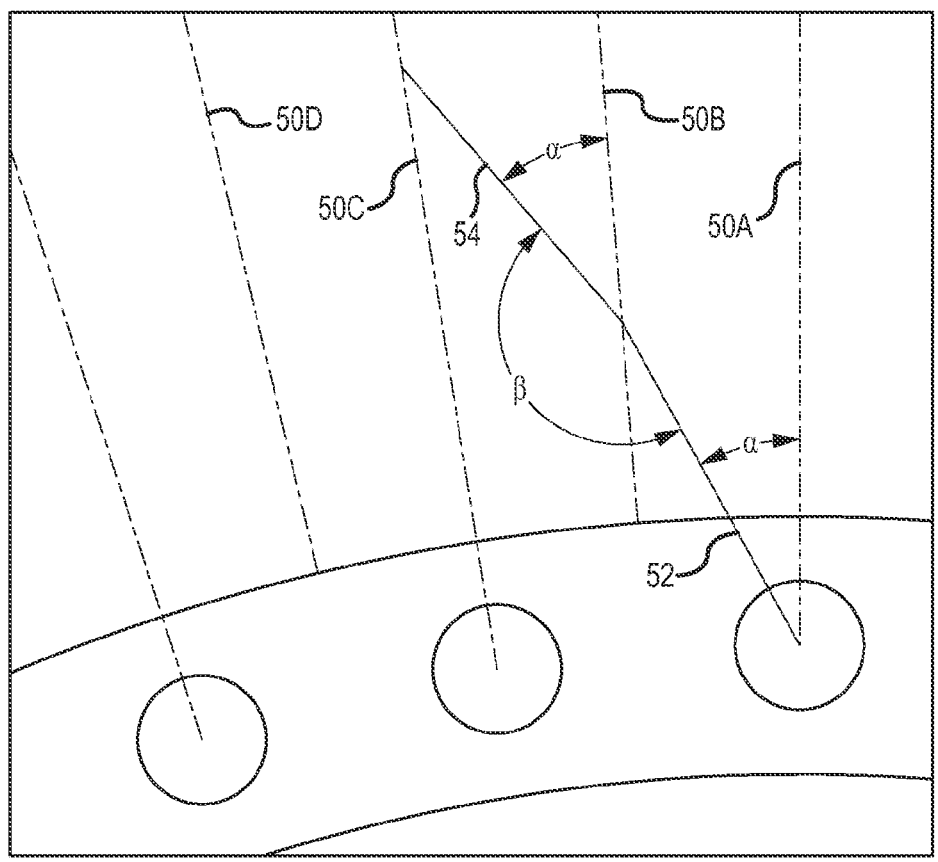
FIG. 27 is an enlarged view of a portion of the inner circular structure of FIG. 24 with two spiral ribs illustrated.
Figure 28:
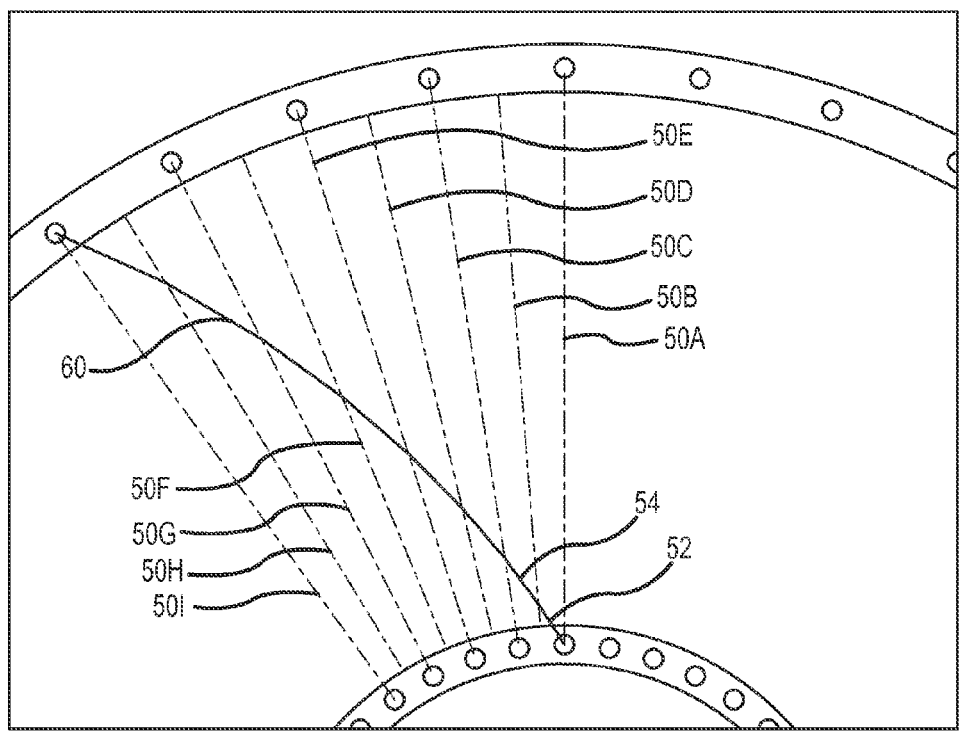
FIG. 28 is an enlarged portion of the inner and outer circular structures of FIG. 24, showing a single spiral rib constructed from interconnected line segments.
Figure 29:
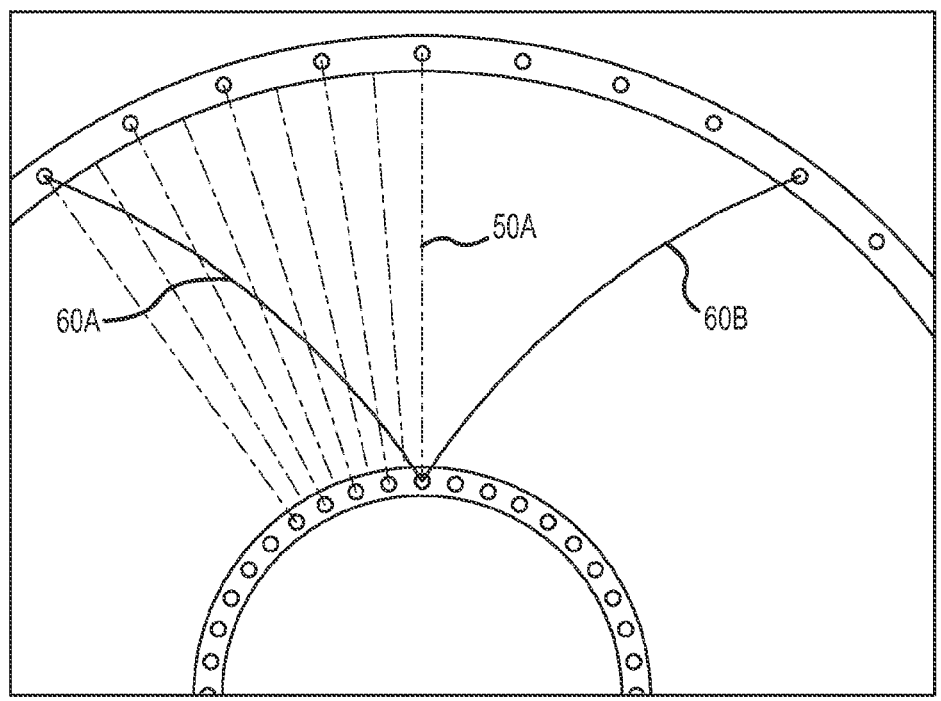
FIG. 29 is an enlarged portion of the inner and outer circular structures of FIG. 24 showing symmetrically opposed spiral ribs emanating from a common inner node.
Figure 30:
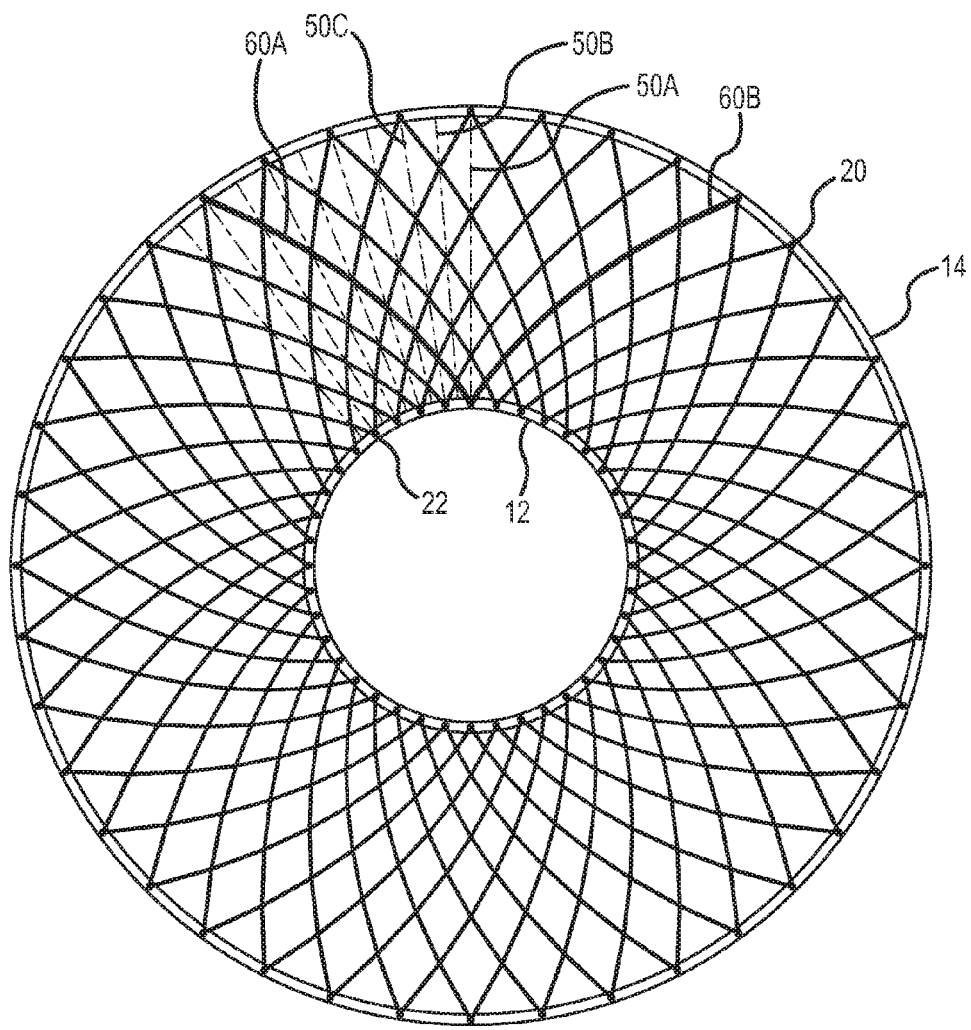
FIG. 30 is a top plan view of the inner and outer circular structures of FIG. 24, populated with a complete set of spiral ribs.
Figure 31:
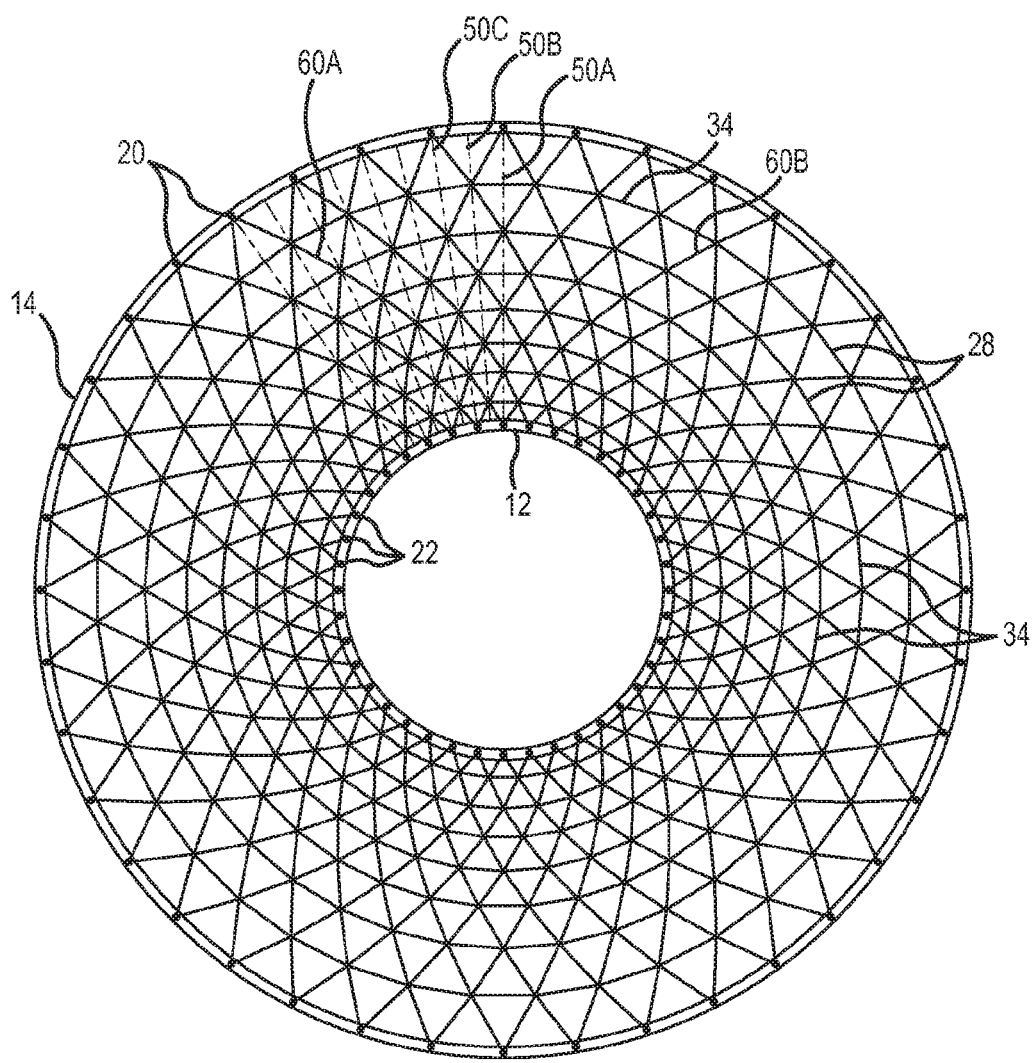
FIG. 31 is a top plan view of the inner and outer circular structure of FIG. 30, with circular hoops added to complete a polargrid.
Figure 32:
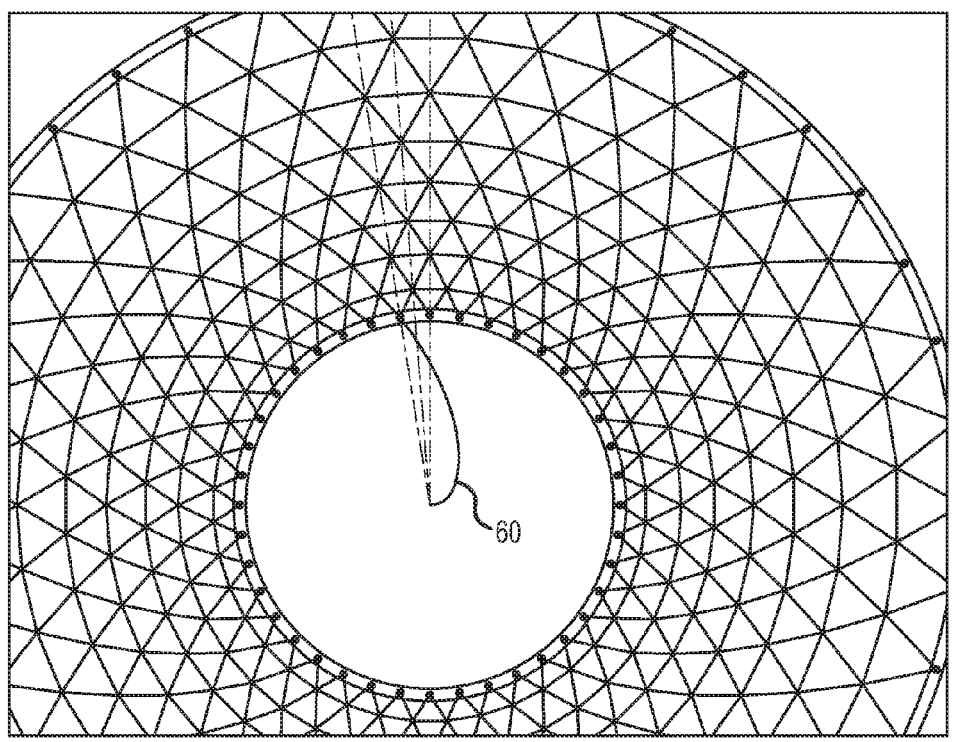
FIG. 32 is a top plan view of an inner and outer circular structure having 40 nodes each, showing a single spiral stringer extending to the origin.

A third method of constructing a polargrid according to embodiments of the present invention is illustrated in FIGS. 24-31. FIG. 24 shows an inner circle 12 and outer circle 14 with forty inner nodes 22 and forty outer nodes 20. Radial construction lines 50A-I interconnect radially aligned nodes and bisect these interconnecting lines. Turning to FIG. 25, as a first step, and starting at either an inner node or an outer node, a single line 52 is drawn from the selected node 22 to the adjacent radial line 50B. The angle $\alpha$ determines the length of the line 52. In this example, a is 33.5 degrees as this is one-half of 67 degrees. The angles are selected, and may be adjusted, for design requirements. The preferred method results in triangles approaching equilateral shape. As illustrated in FIG. 26, a second line 54 is drawn from the end of the first line 52 to the next adjacent radial line 50C at the same angle $\alpha$ (33.5° as the first line 52. As shown in FIG. 27, the angle $\beta$ between the two segments 52 and 54 is 177.5 degrees. The remaining line segments that complete the spiral stringer between the inner and outer circular structures are added in the same manner. This methodology forms a spiral stringer 60 by these and the following spiral ribs that are formed in the same manner as ribs 52 and 54. The last line segment may be tailored such that all of the end points of the final line segments fall coincident with the nodes on the inner or outer circle depending upon the direction of construction. A completed spiral stringer 60A is shown in FIG. 28. As illustrated in FIG. 29, a mirrored spiral stringer 60B is formed opposite the radial line 50A. The process is repeated until all of the spiral ribs are formed interconnecting the inner and outer circles 12 and 14 as shown in FIG. 30. Here, because there are forty nodes, adjacent nodes are 9 degrees apart. FIG. 31 illustrates a completed polargrid 10 where hoop ribs 34 interconnect nodes created by intersecting spiral stringers 60. As shown in FIG. 32, the spiral stringer 60 diverges away from a constant arc radius. The radius increases as one moves further from center. Stated differently, this causes the spiral stringer 60 to converge toward the coaxial center point—essentially resulting in a logarithmic spiral not an arc. This technique may be used to create polar grids of varying shapes using other logarithmic spirals as design circumstances dictate.

Figure 33:
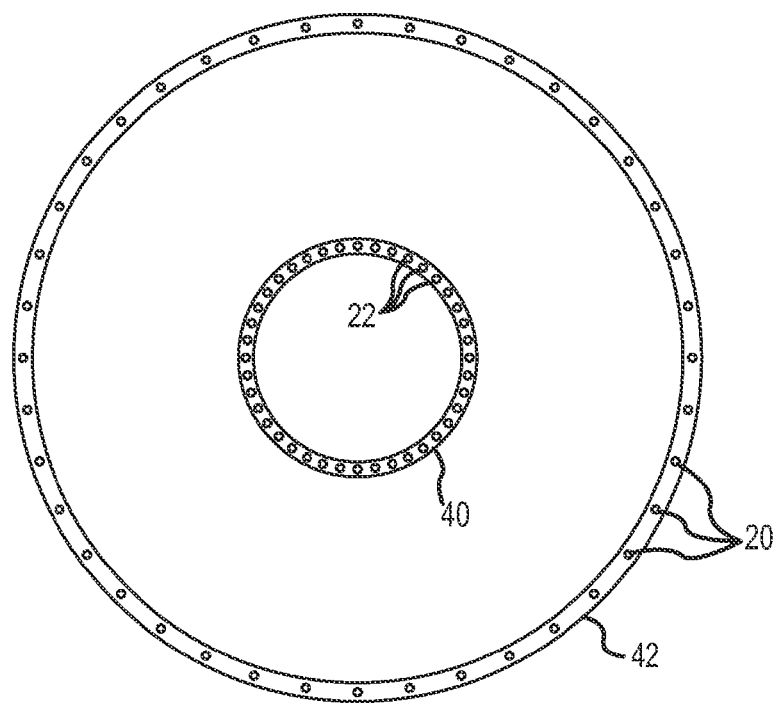
FIG. 33 is a top plan view of an inner and outer circular structure.
Figure 34:
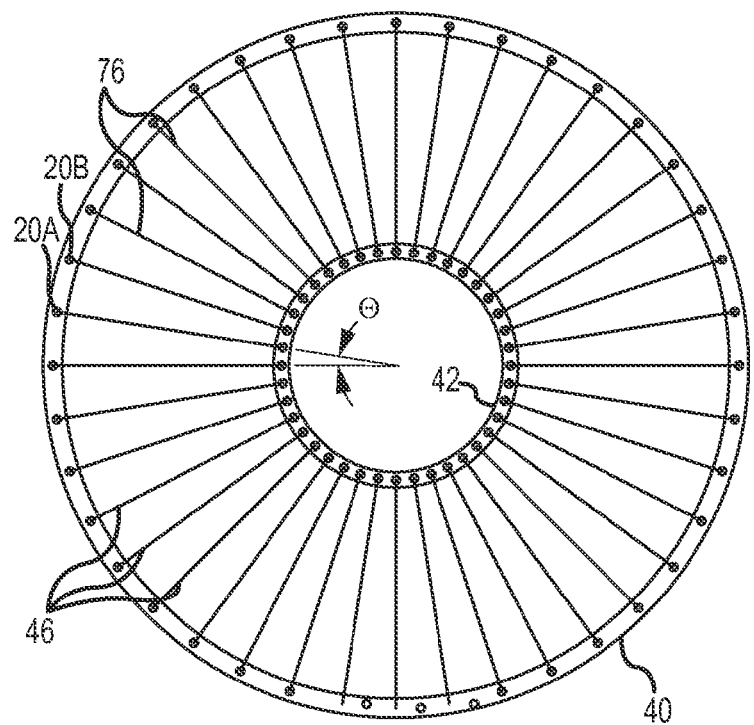
FIG. 34 is a top plan view of the embodiment of FIG. 33 showing radially extending lines between radially aligned nodes.
Figure 35:
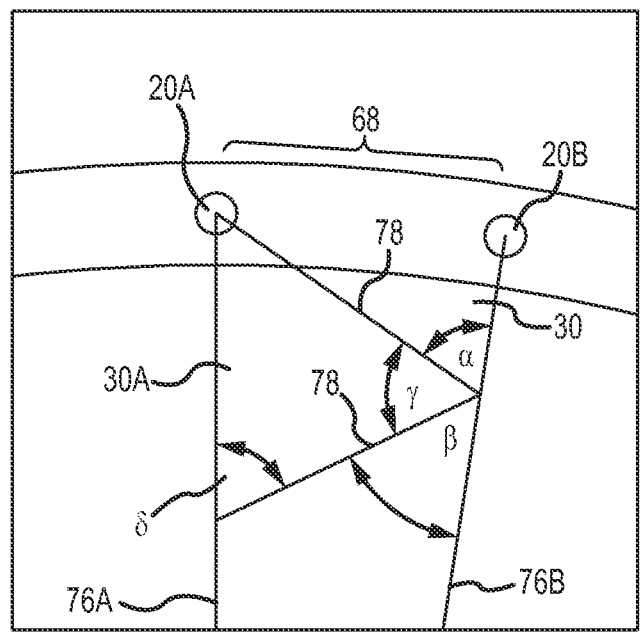
FIG. 35 illustrates the creation of a first triangle at the outermost location between two adjacent radial lines according to a third method of the present invention.
Figure 36:
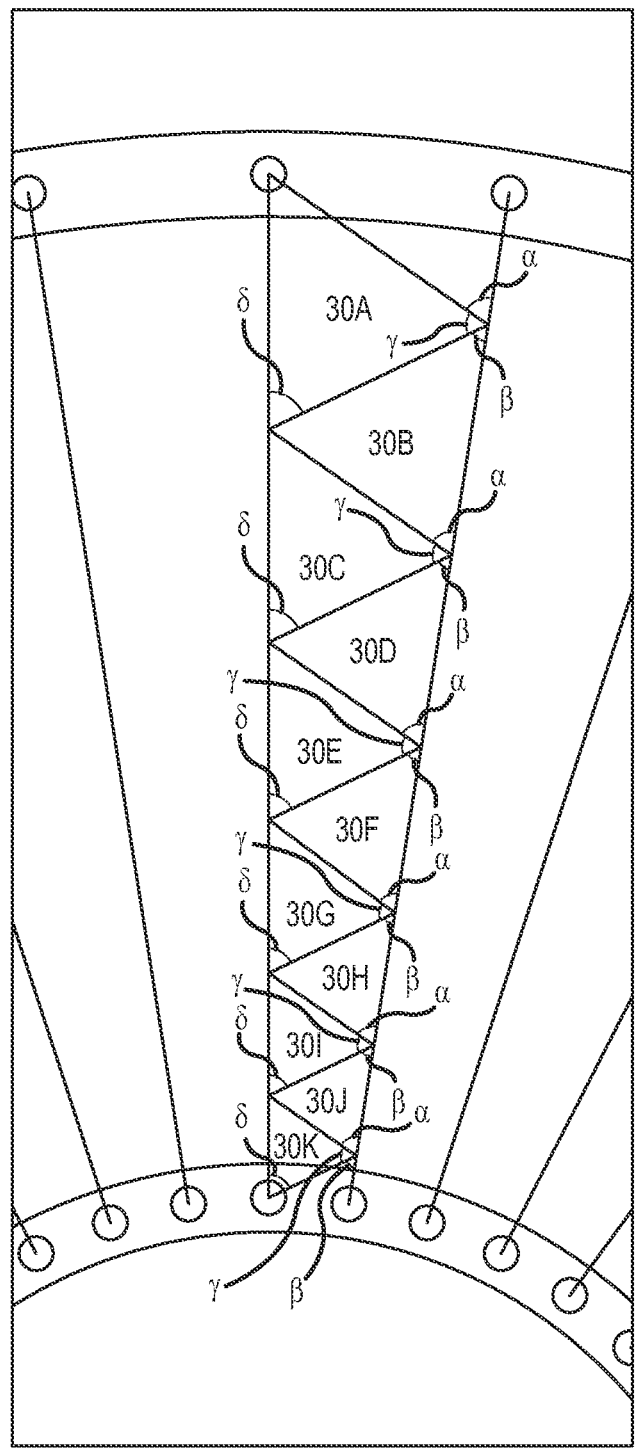
FIG. 36 shows a complete set of triangles formed between adjacent radial lines according to a third embodiment of the invention.

A fourth method of constructing a polargrid according to embodiments of the present invention will now be described. This fourth method is illustrated in FIGS. 33-38. FIG. 33 shows an inner circular structure 40 and an outer circular structure 42 with nodes 22 and 20, respectively, formed on each circle. In this example forty nodes are located on the inner and outer circles 22 and 20. FIG. 34 illustrates radial ribs 76 extending between radially aligned outer nodes 20 and inner diameter nodes 22. As a first step, and with reference to FIG. 35, a pair of adjacent radial ribs 76A and 76B are selected and define a radial row 68. With nodes 20A and 20B also selected, angle $\alpha$ and angle $\beta$ are, respectively, less than and greater than 60 degrees by 4.5 degrees. 4.5 degrees is chosen in this example to create generally equilateral triangles, but may be varied as appropriate to satisfy design requirements. Angle gamma $\gamma$ is approximately 60 degrees. The legs 78 of the triangle 30A are defined by the selection of the angles $\alpha$ and $\beta$. Angle delta $\delta$ is equivalent to angle $\alpha$. The next inner triangle 30B is formed in the same way with the same angles $\alpha$, $\beta$, $\gamma$ and $\delta$. The process is repeated for the remaining triangles in the radial row 68 of triangles 30C-30K. Relative angles for FIG. 36 are shown in the below

TABLE 1

| Triangle | Angle α | Angle β | Angle γ | Angle δ |
| --- | --- | --- | --- | --- |
| 30A | — | — | 60° | 64.5° |
| 30B | 64.5° | 55.5° | — | — |
| 30C | — | — | 60° | 64.5° |
| 30D | 64.5° | 55.5° | — | — |
| 30E | — | — | 60° | 64.5° |
| 30F | 62.54° | 55.5° | — | — |
| 30G | — | — | 61.96° | 64.5° |
| 30H | 64.5° | 55.5° | — | — |
| 30I | — | — | 60° | 64.5° |
| 30J | 64.5° | 55.5° | — | — |
| 30K | — | — | 60° | 64.5 |

Figure 37:
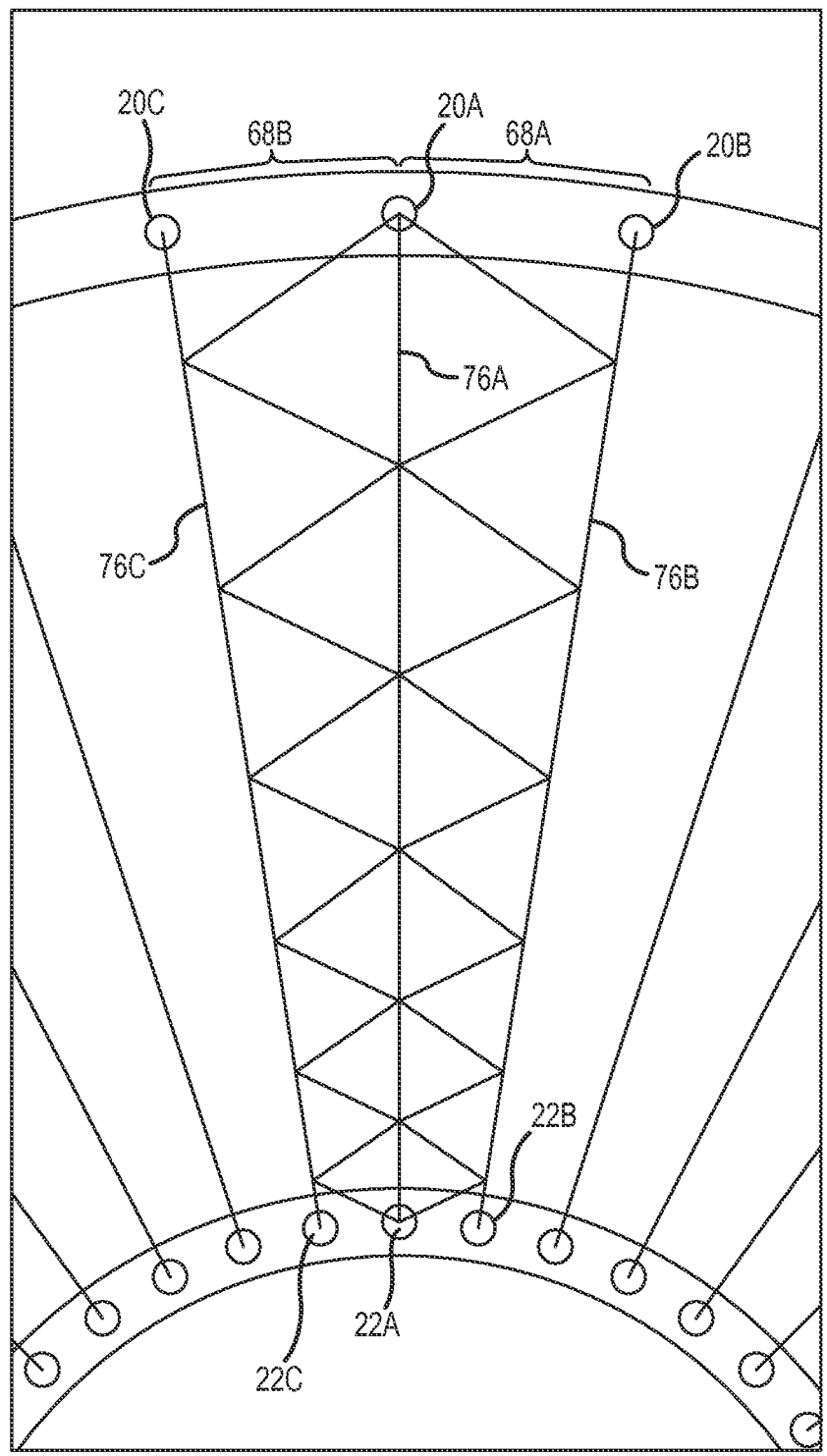
FIG. 37 shows two radial rows of triangles created according to the third method of the present invention.
Figure 38:
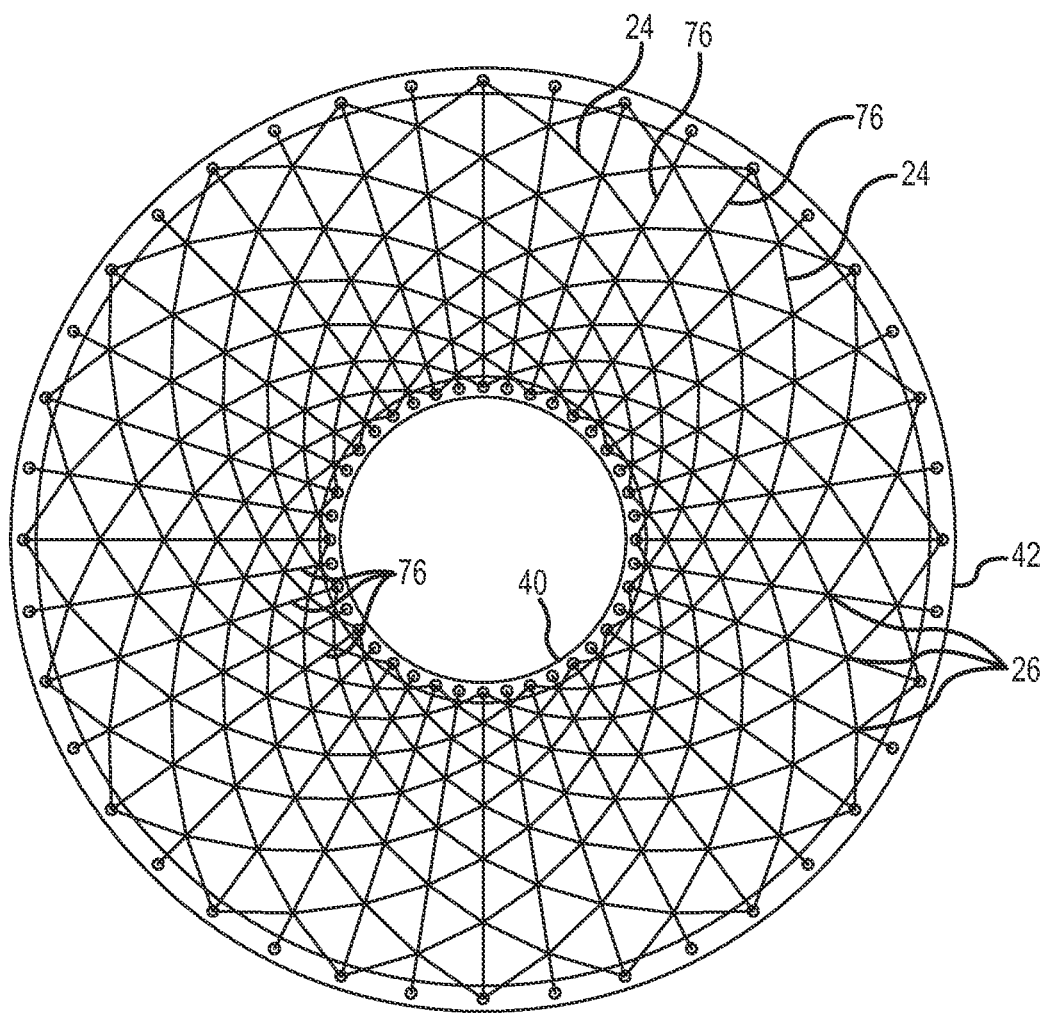
FIG. 38 is a top plan view of a completed polargrid made according to the third method of the present invention.
Figure 39:
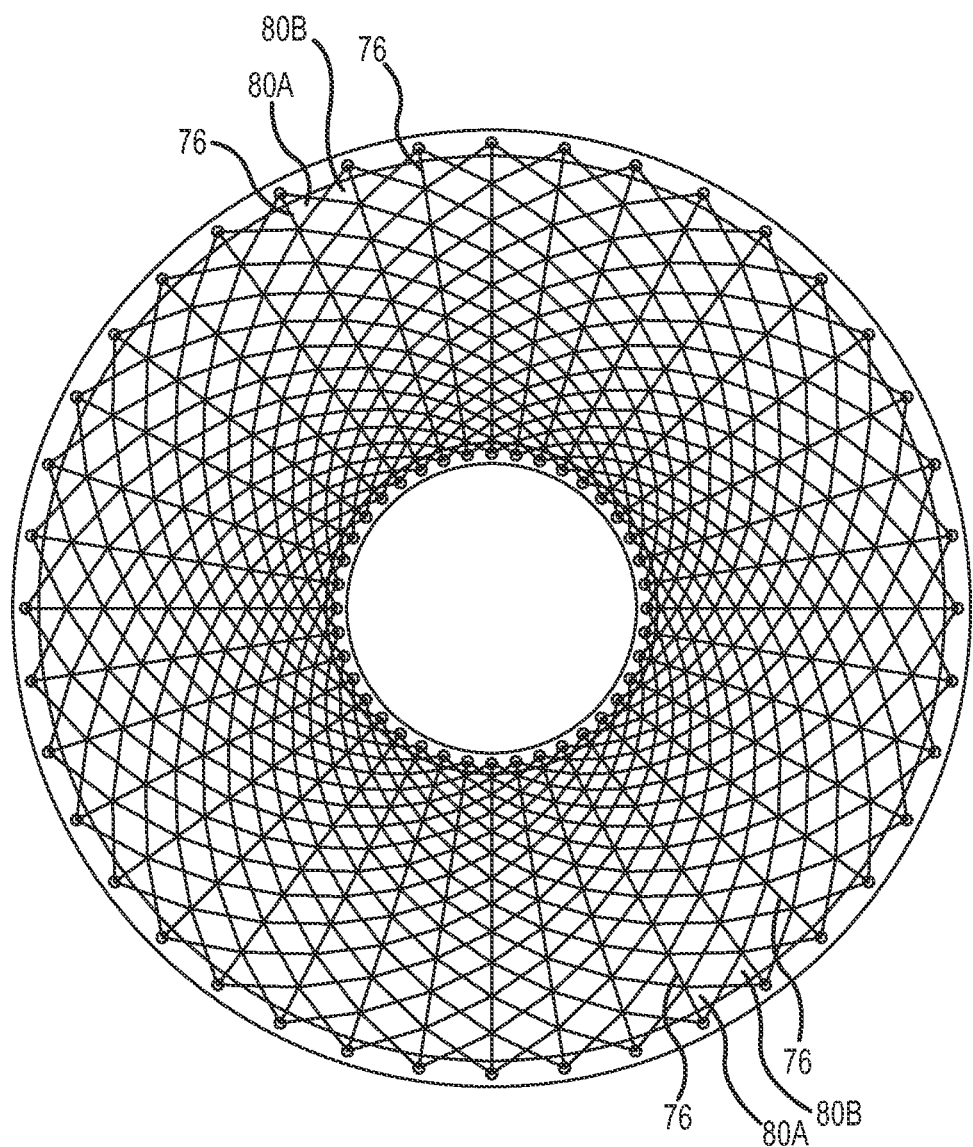
FIG. 39 shows an alternative embodiment of the polargrid shown in FIG. 38.
Figure 40:
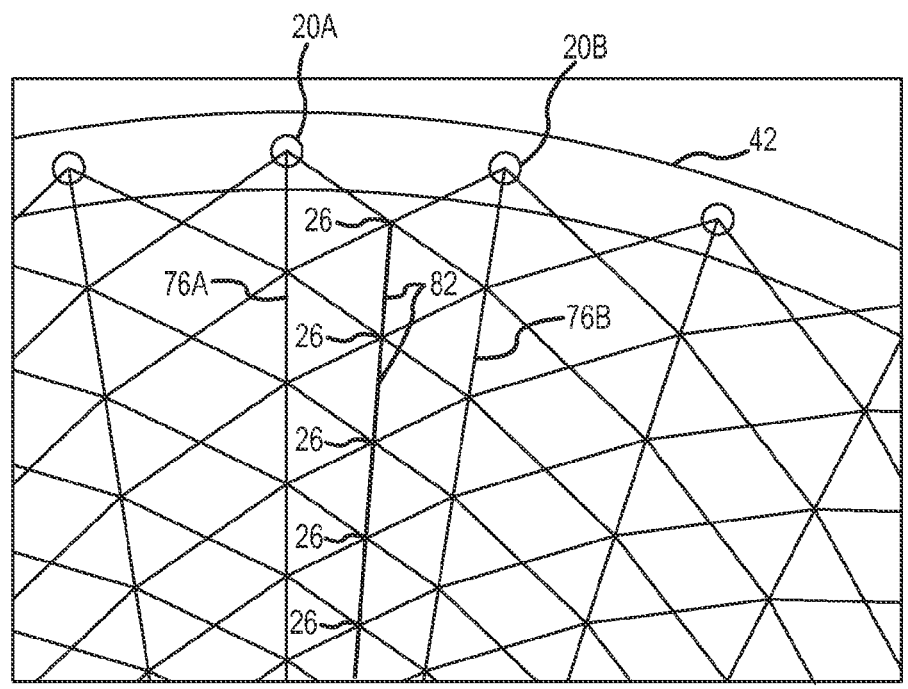
FIG. 40 is a partial enlarged view of the polargrid illustrated in FIG. 39.

In this example, one triangle 30F is allowed to vary from pattern to maintain coincidence of the nodes with the radial ribs. The location within the radial row 68 of triangles 30 for the varied triangle may vary as required by application. In this example triangle 30F is altered. Triangle 30F is altered to create coincident intersections of the radial stringers 24 and hoop nodes 26. Any of the triangles may be altered to achieve this objective. Slight non-coincidence could also result in an acceptable structure, but the resulting structure may be less efficient as more material may need to be added to handle slight load path offset. FIG. 37 shows an adjacent second row of triangles 30 formed by the same method defining radial rows 68A and 68B. FIG. 38 depicts a completed polargrid using the fourth methodology. As illustrated, spiral stringers 24 connect with one-half of the inner and outer nodes 20 and 22. Every other inner and outer node 20 and 22 are interconnected only by a radial stringer 76. FIGS. 39 and 40 show an alternative embodiment comprising two radial rows 80A and 80B formed between an adjacent pair of radial ribs 76. The process is the same as described above in connection with FIGS. 35 and 36, but every inner and outer node 20 and 22 is used. Because the process is repeated 40 times (because all 40 nodes in the example are used), the density of triangles 30 is doubled compared to that of FIG. 38. FIG. 40 shows an enlarged portion of the polargrid of FIG. 39 further illustrating that additional radial ribs 82 may be added to nodes 26 to further strengthen the structure. Here, the additional radial ribs 82 do not interconnect the inner and outer circular structures 12 and 14, but may do so to suit design requirements. This creates substantially equilateral triangles from the diamond shaped patterns that exist and are illustrated in FIG. 39.

Figure 41:
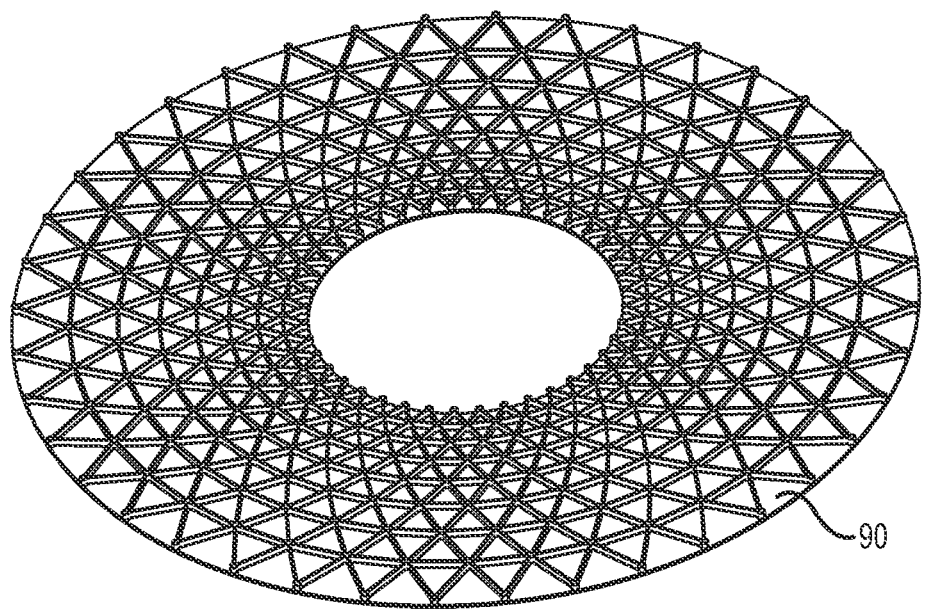
FIG. 41 is a top perspective view of a polargrid formed with a surface skin.
Figure 42:
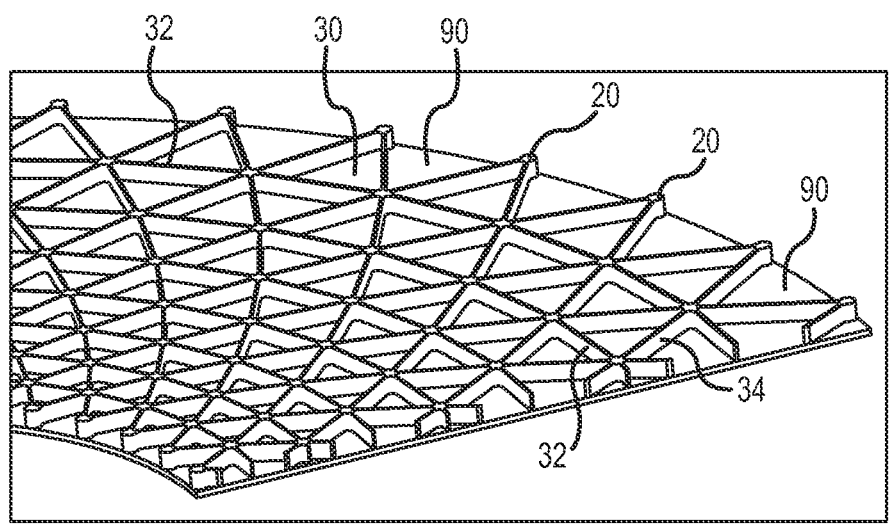
FIG. 42 is a partial enlarged perspective section view of the embodiment of FIG. 41.
Figure 43:
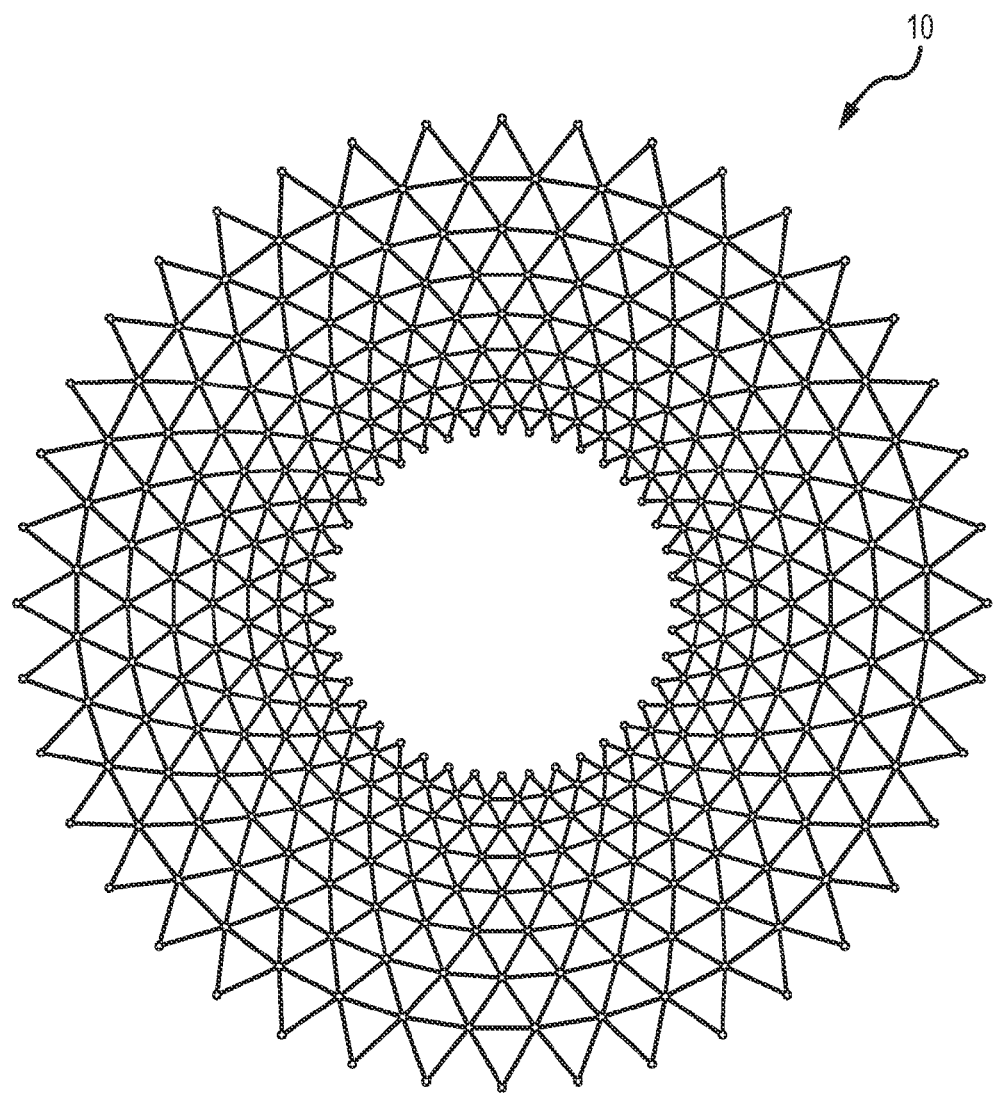
FIG. 43 is a top plan view of a conical shaped polargrid.
Figure 44:
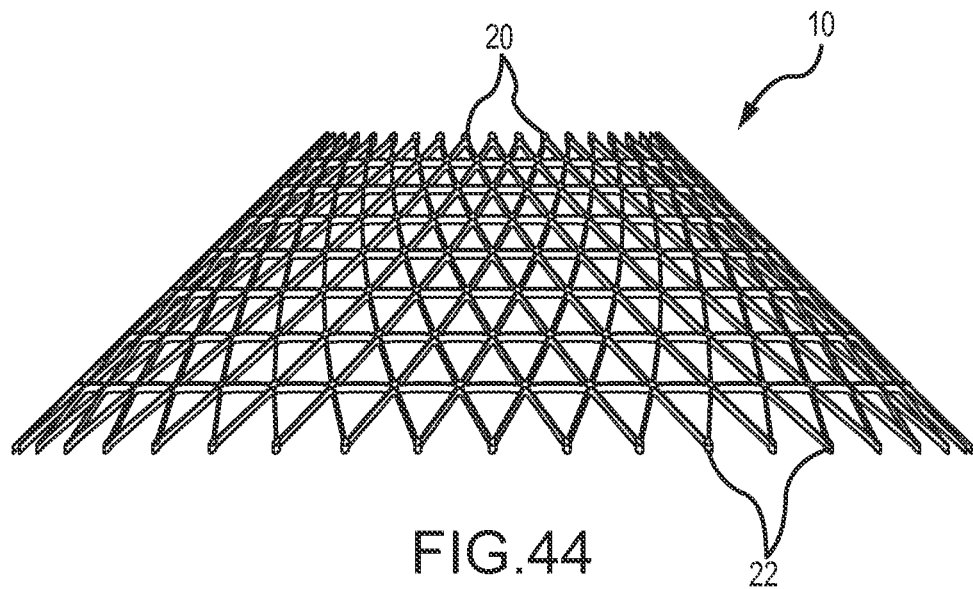
FIG. 44 is a front elevation view of the embodiment of FIG. 43.
Figure 45:
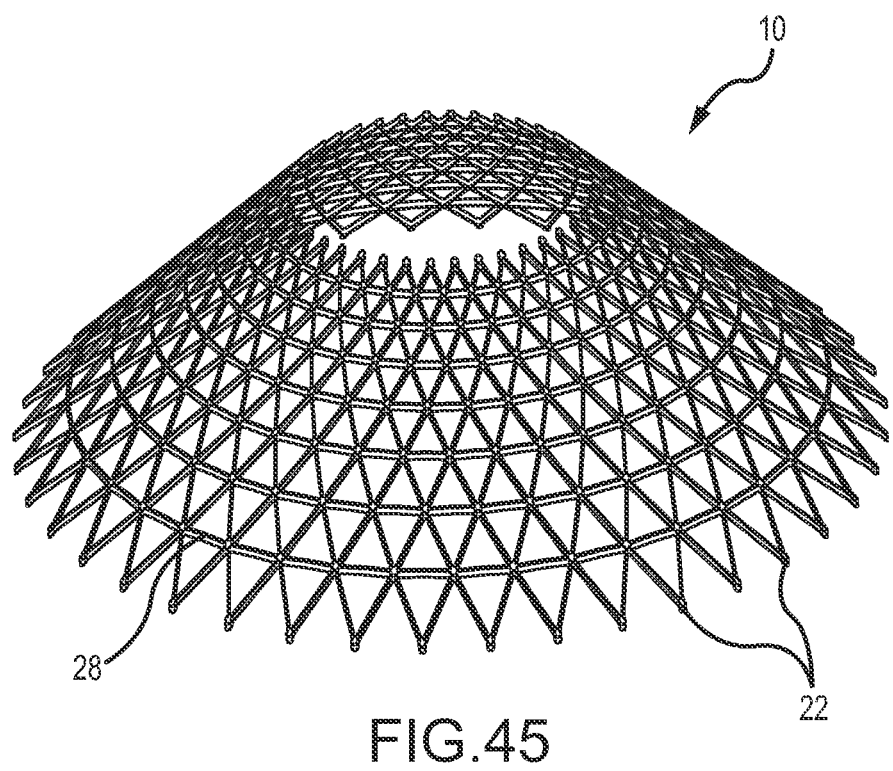
FIG. 45 is a perspective view of the embodiment of FIG. 43.
Figure 46:
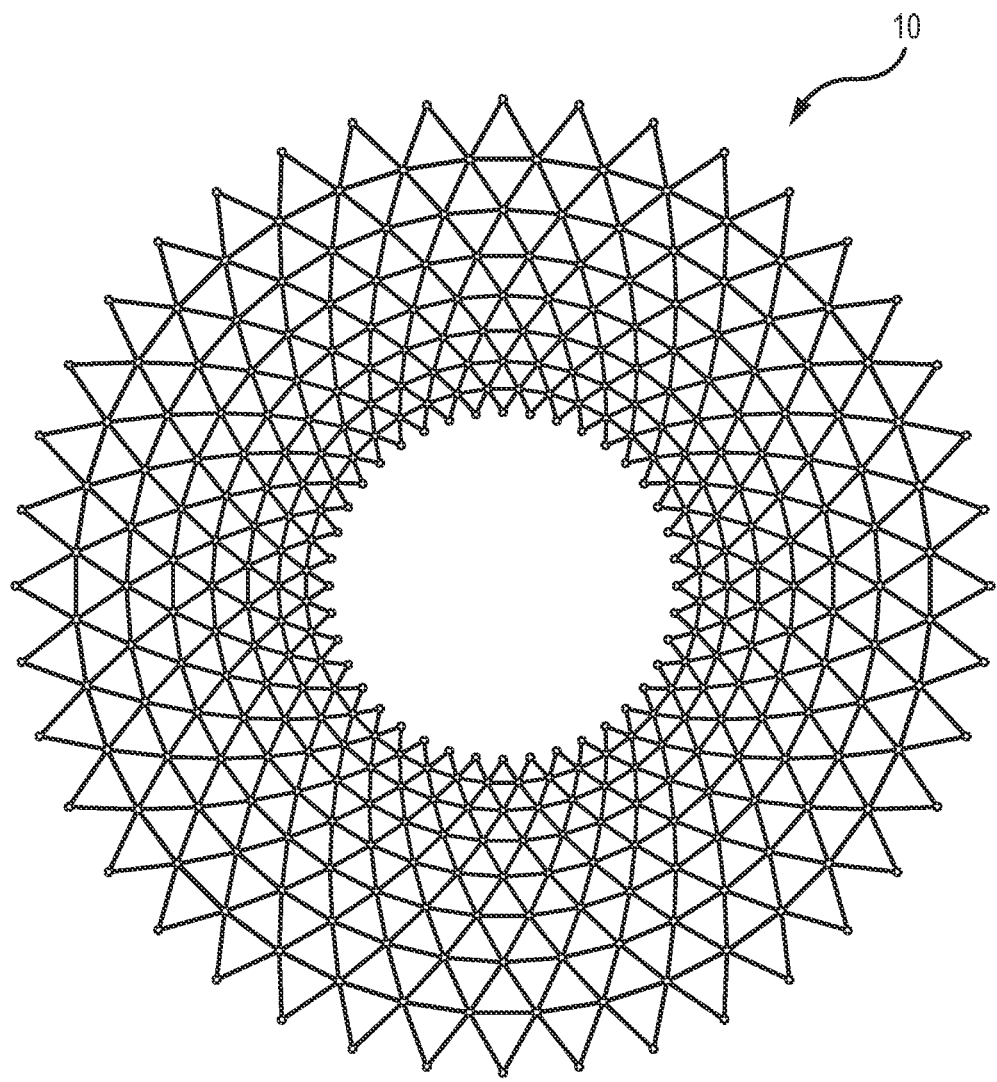
FIG. 46 is a top plan view of a dome shaped polargrid.
Figure 47:
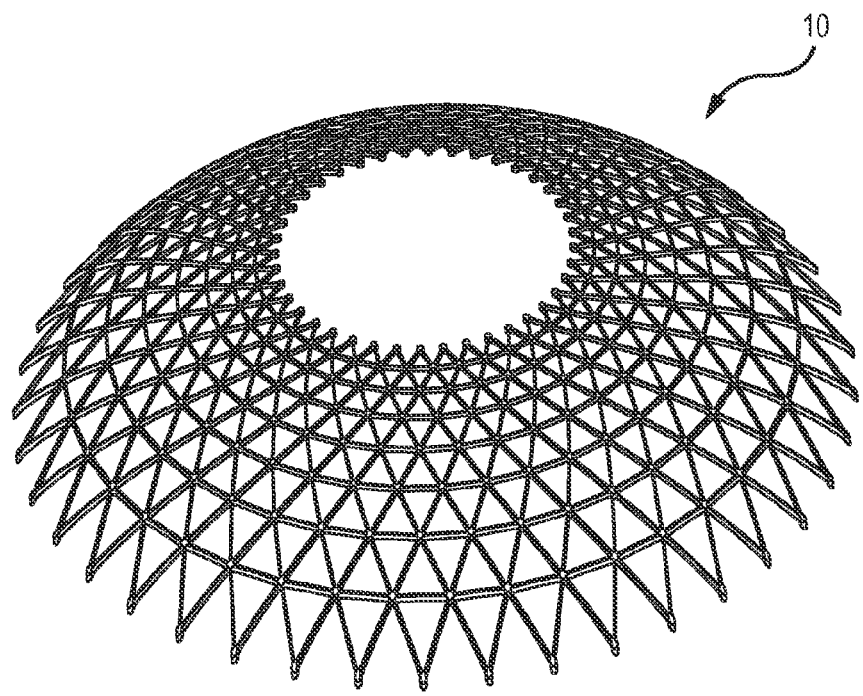
FIG. 47 is a top perspective view of the embodiment of FIG. 46.
Figure 48:
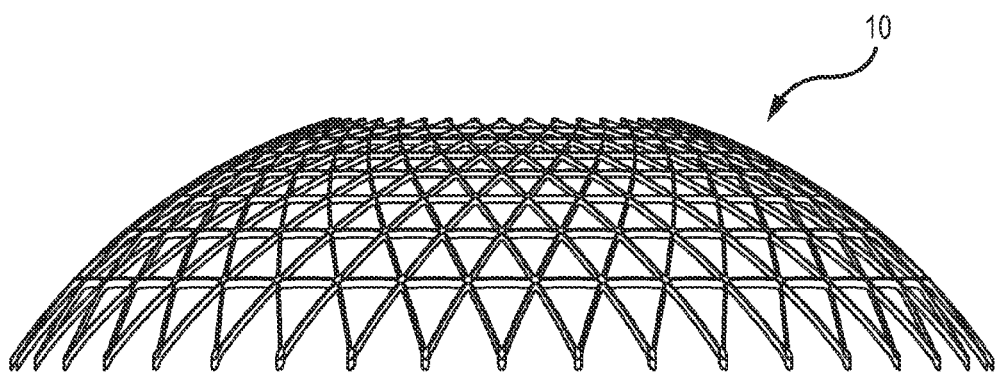
FIG. 48 is a front elevation view of the embodiment of FIG. 46.

The polargrid lattice structure of the present invention may be created with skins 90 to provide additional strength as shown in FIGS. 41 and 42. In addition, the polargrid structure is useful in conic and domed shapes as shown in FIGS. 43-45 and 46-48, respectively.

Figure 49:
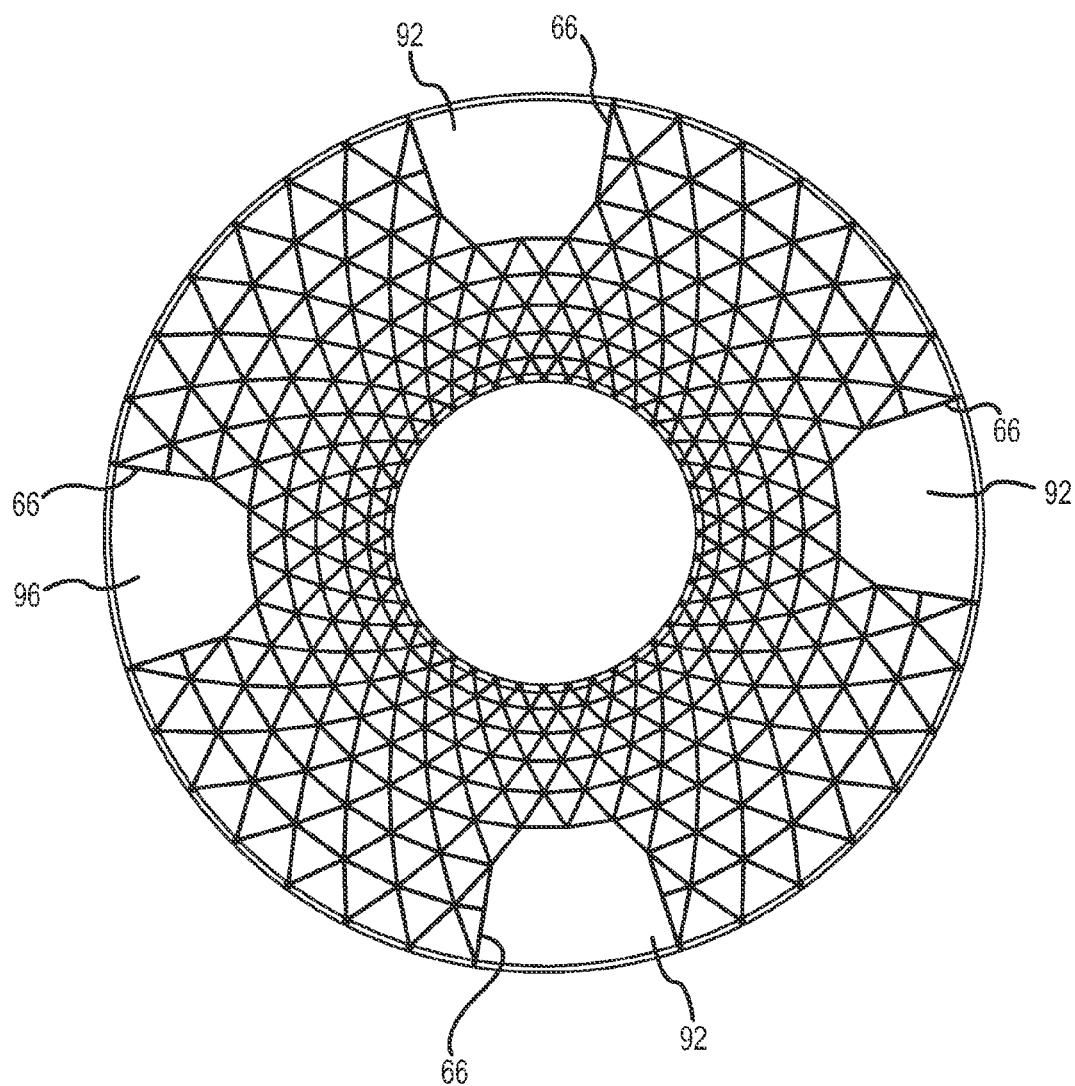
FIG. 49 is an alternative embodiment of a polargrid made according to the present invention.

FIG. 49 shows a modified polargrid structure with open areas 92 accommodating pass through of equipment and other structure, and modifications made to the two outermost circular rows 48A and 48B to accommodate loading. Radial ribs 66 may also be added at an outer diameter similar to those shown in FIG. 23 with respect to inner circular rows.

The various embodiments, methods and resulting polargrid structures have been described herein in detail and create substantially equivalent polargrid structures. Such polargrid structures are capable of being designed and constructed using other methods and of being practiced or of being carried out in various ways as will be readily understood by those of skill in the art upon review of the present disclosure. Such modifications and alterations of those embodiments as will occur to those skilled in the art upon review of the present disclosure are within the scope and spirit of the claimed invention, as set forth in the following claims. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A lattice grid structure comprising:
   a. A first hoop having a substantially constant first diameter;
   b. A second hoop having a substantially constant second diameter, wherein the second diameter is less than the first diameter;
   c. A third hoop having a substantially constant third diameter, wherein the third diameter is less than the second diameter;
   d. A first circular row comprising a plurality of substantially isosceles triangles wherein each isosceles triangle comprises two spiral ribs and a hoop rib, and wherein the spiral ribs extend between the first hoop and the second hoop, and the hoop rib comprises a length of either the first hoop or the second hoop;
   e. A second circular row comprising a plurality of substantially isosceles triangles wherein each isosceles triangle comprises two spiral ribs and a hoop rib, wherein the spiral ribs extend between the second hoop and the third hoop, wherein the hoop rib comprises a length of either the second hoop or the third hoop, and wherein every other isosceles triangle disposed in the second circular row shares a hoop rib with one isosceles triangle disposed in the first circular row; and
   f. Wherein the isosceles triangles of the first circular row and the isosceles triangles of the second circular row are substantially co-planar.

2. The structure of claim 1, further comprising:
   a. A plurality of first nodes located on the first hoop, each first node defined as the location where a pair of spiral ribs intersect the first hoop;
   b. A plurality of second nodes located on the second hoop, each second node defined as the location where four spiral ribs intersect with the second hoop;
   c. A plurality of third nodes located on the third hoop, each third node defined as the location where at least two spiral ribs intersect the third hoop.

3. The structure of claim 2, wherein the isosceles triangles in the first and second circular rows that share a common hoop rib define a diamond shaped structure comprising one first node, two second nodes and one third node, and wherein the distance between the first and third nodes is greater than the distance between the two second nodes.

4. The structure of claim 3, wherein the quantity of first, second and third nodes is the same.

5. The structure of claim 3, wherein the quantity of third nodes is less than the quantity of first nodes.

6. The structure of claim 3, wherein the quantity of first nodes is less than the quantity of third nodes.

7. The structure of claim 1, wherein the first, second and third hoops are disposed in parallel but different planes.

8. The structure of claim 1, further comprising:
   a. A fourth hoop having a substantially constant fourth diameter, wherein the fourth diameter is less than the third diameter; and
   b. A third circular row comprising a plurality of substantially isosceles triangles wherein each isosceles triangle comprises two spiral ribs and a hoop rib, and wherein the spiral ribs extend between the third hoop and the fourth hoop, and the hoop rib comprises a length of either the third hoop or the fourth hoop; and wherein the isosceles triangles of the third circular row are substantially coplanar with the isosceles triangles of the first and second rows.

9. A lattice grid structure comprising:
 a. An outer circular structure having a substantially constant first diameter;
 b. An inner circular structure having a substantially constant second diameter, wherein the second diameter is less than the first diameter and concentrically oriented relative to the outer circular structure;
 c. A plurality of intermediate hoops, each of a substantially constant diameter, each having a different diameter less than the diameter of the outer circular structure and greater than the diameter of the inner circular structure, the plurality of intermediate hoops concentrically disposed between the outer circular structure and inner circular structure; and
 d. A plurality of circular rows of substantially isosceles triangles, wherein a row of substantially isosceles triangles is disposed between adjacent concentric hoops; and
 e. Wherein the plurality of rows of substantially isosceles triangles and the plurality of intermediate hoops are substantially co-planar.

10. The structure of claim 9, wherein one side of each substantially isosceles triangle in each circular row of substantially isosceles triangles is formed by a length of at least one of the plurality of hoops.

11. The structure of claim 10, wherein one side of every other substantially isosceles triangle in each circular row of substantially isosceles triangles is formed by a length of hoop from the first one of the plurality of hoops, and one side of each remaining substantially isosceles triangle in each circular row of substantially isosceles triangles is formed by a length of hoop in a second of the plurality of hoops, where the first and second hoops are adjacent.

12. A lattice grid structure comprising:
 a. A first hoop having a substantially constant first diameter;
 b. A second hoop having a substantially constant second diameter, wherein the second diameter is less than the first diameter;
 c. A plurality of arcuately shaped spiral stringers extending between the first circular hoop and the second circular hoop;
 d. A plurality of first hoop nodes spaced about the first hoop, each first node formed by the intersection of two spiral stringers and the first hoop;
 e. A plurality of second nodes spaced about the second hoop, each second hoop node formed by the intersection of two spiral stringers and the second hoop;
 f. A third hoop having a substantially constant third diameter, wherein the third diameter is greater than the second diameter and less than the first diameter;
 g. A plurality of third nodes spaced about the third hoop, each third node formed by the intersection of two spiral stringers and the third hoop;
 h. Wherein substantially all of the spiral stringers are oriented in a substantially common plane; and
 i. Whereby a first circular row of substantially isosceles triangles are formed between the first hoop and the third hoop, and a second circular row of substantially isosceles triangles are formed between the third hoop and the second hoop and wherein the isosceles triangles are substantially co-planar.

13. The structure of claim 12, wherein the isosceles triangles comprising the first circular row are larger in area than that isosceles triangles comprising the second circular row.

14. The structure of claim 12, further comprising:
 a. a fourth hoop having a substantially constant fourth diameter, wherein the fourth diameter is smaller than the second diameter;
 b. a plurality of fourth nodes spaced about the fourth hoop, each fourth node formed by the intersection of two spiral stringers and the fourth hoop; and
 c. a third circular row of substantially isosceles triangles formed between the second hoop and the fourth hoop, wherein the isosceles triangles comprising the third circular row are smaller in area than that isosceles triangles comprising the second circular row.

15. The lattice grid structure of claim 12, wherein each arcuately shaped spiral stringers extending between the first and third hoops approximate a length of a logarithmic spiral.

16. The lattice grid of claim 12, where each spiral stringer extending from a single node approximates a curved shape.

17. A lattice grid structure comprising:
 a. A first hoop having a substantially constant first diameter;
 b. A second hoop having a substantially constant second diameter, wherein the second diameter is less than the first diameter;
 c. A plurality of substantially linear radial stringers connecting the first hoop and second hoop;
 d. A first radial row comprises a plurality of substantially isosceles triangles, wherein each triangle comprises two spiral ribs and a radial rib;
 e. A second radial row comprises a plurality of substantially isosceles triangles, wherein each triangle comprises two spiral ribs and a radial rib, wherein every other isosceles triangle disposed in the first radial row and second radial row share the same radial rib, and wherein substantially all of the isosceles triangles are substantially co-planar.

18. A spacecraft comprising:
 a. A first substantially cylindrical structure with an inner surface having a substantially constant first diameter;
 b. A second substantially cylindrical structure with an outer surface having a substantially constant second diameter, wherein the second diameter is less than the first diameter;
 c. A plurality of first nodes disposed on the inner surface of the first substantially cylindrical surface and spaced about the inner surface in a co-planar orientation to proximate a first circle;
 d. A plurality of second nodes disposed on the outer surface of the second substantially cylindrical surface and spaced about the outer surface in a co-planar orientation to proximate a second circle, the quantity of second nodes equal to the quantity of first nodes, and the first and second nodes being substantially co-planar;
 e. A plurality of arcuately shaped spiral stringers interconnecting the first and second nodes; wherein two spiral stringers extend from each first node and connect with different second nodes, and two spiral stringers extend from each second node and connect with different first nodes; and wherein substantially all of the spiral stringers are substantially co-planar with the first and second nodes;
 f. Wherein the spiral stringers intersect with other spiral stringers at locations between the first circular surface and the second circular surface to define a node at each intersection location; and g. At least one substantially circular hoop of substantially constant diameter is positioned between the first and second circles to intersect with the nodes positioned at substantially the same distance from the second circular surface.

19. A lattice grid structure comprising:
a. A first hoop having a substantially constant first diameter;
b. A second hoop having a substantially constant second diameter, wherein the second diameter is less than the first diameter;
c. A first circular row comprising a plurality of triangles, wherein each triangle comprises two spiral ribs and a radial rib, and wherein the length of each spiral rib and each radial rib of the first circular row is substantially the same;
d. A second circular row comprising a plurality of triangles, wherein each triangle comprises two spiral ribs and a radial rib, and wherein the length of each spiral rib and each radial rib of the second circular row is substantially the same; and
e. Wherein substantially all of the isosceles triangles are substantially co-planar and the lattice grid is substantially isotropic.

* * * * *